(12) United States Patent
Okura et al.

(10) Patent No.: US 10,044,953 B2
(45) Date of Patent: Aug. 7, 2018

(54) SOLID-STATE IMAGING DEVICE, METHOD FOR DRIVING SOLID-STATE IMAGING DEVICE, AND ELECTRONIC APPARATUS

(71) Applicant: Brillnics Japan Inc., Tokyo (JP)

(72) Inventors: Shunsuke Okura, Tokyo (JP); Shinji Ohsawa, Tokyo (JP); Norio Yoshimura, Tokyo (JP)

(73) Assignee: Brillnics Japan Inc., Tokyo (JP)

( * ) Notice: Subject to any disclaimer, the term of this patent is extended or adjusted under 35 U.S.C. 154(b) by 0 days.

(21) Appl. No.: 15/185,882

(22) Filed: Jun. 17, 2016

(65) Prior Publication Data

US 2016/0373673 A1    Dec. 22, 2016

(30) Foreign Application Priority Data

Jun. 19, 2015  (JP) ................................. 2015-123573

(51) Int. Cl.
*H04N 5/359*  (2011.01)
*H04N 5/378*  (2011.01)
*H04N 5/345*  (2011.01)

(52) U.S. Cl.
CPC ........... *H04N 5/3598* (2013.01); *H04N 5/345* (2013.01); *H04N 5/378* (2013.01)

(58) Field of Classification Search
CPC .............................. H04N 5/378; H04N 5/367
See application file for complete search history.

(56) References Cited

U.S. PATENT DOCUMENTS

| | | | |
|---|---|---|---|
| 7,825,982 B2 | 11/2010 | Takayanagi | |
| 2010/0085448 A1* | 4/2010 | Fukuoka | H04N 5/361 348/241 |

\* cited by examiner

*Primary Examiner* — Twyler Haskins
*Assistant Examiner* — Fayez Bhuiyan
(74) *Attorney, Agent, or Firm* — Westerman, Hattori, Daniels & Adrian, LLP

(57) ABSTRACT

A solid-state imaging device capable of reducing an area of a chip, capable of realizing both reduction of voltage and prevention of inversion video noise and consequently capable of realizing a higher image quality having a pixel portion and a clipping circuit capable of clipping a pixel readout voltage in accordance with a clipping voltage, wherein the pixel includes a photo-electric conversion element PD, a transfer element capable of transferring a charge accumulated in the photo-electric conversion element in a transfer period, a floating diffusion FD to which the charge accumulated in the photo-electric conversion element is transferred through a transfer element, a source-follower element which converts the charge in the floating diffusion to a voltage signal in accordance with a charge quantity, and a reset element which resets the floating diffusion to a predetermined potential in a resetting period, and the clipping circuit is arranged in an ineffective region of the pixel portion, a driving method for the same, and an electronic apparatus.

19 Claims, 18 Drawing Sheets

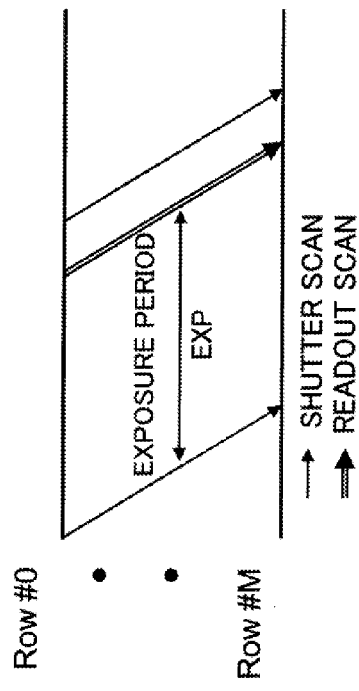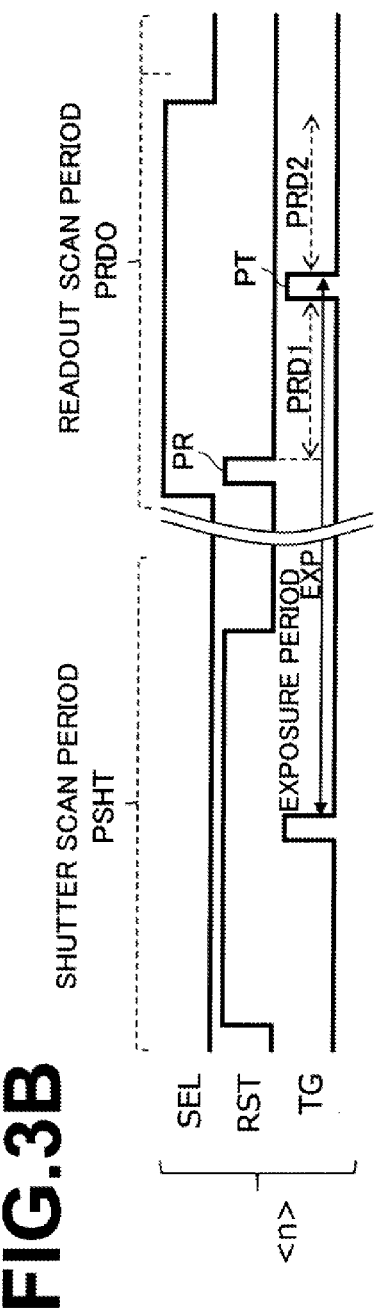

80: CLIPPING CIRCUIT
81: RESET VOLTAGE CLIPPING PORTION
82: SIGNAL VOLTAGE CLIPPING PORTION

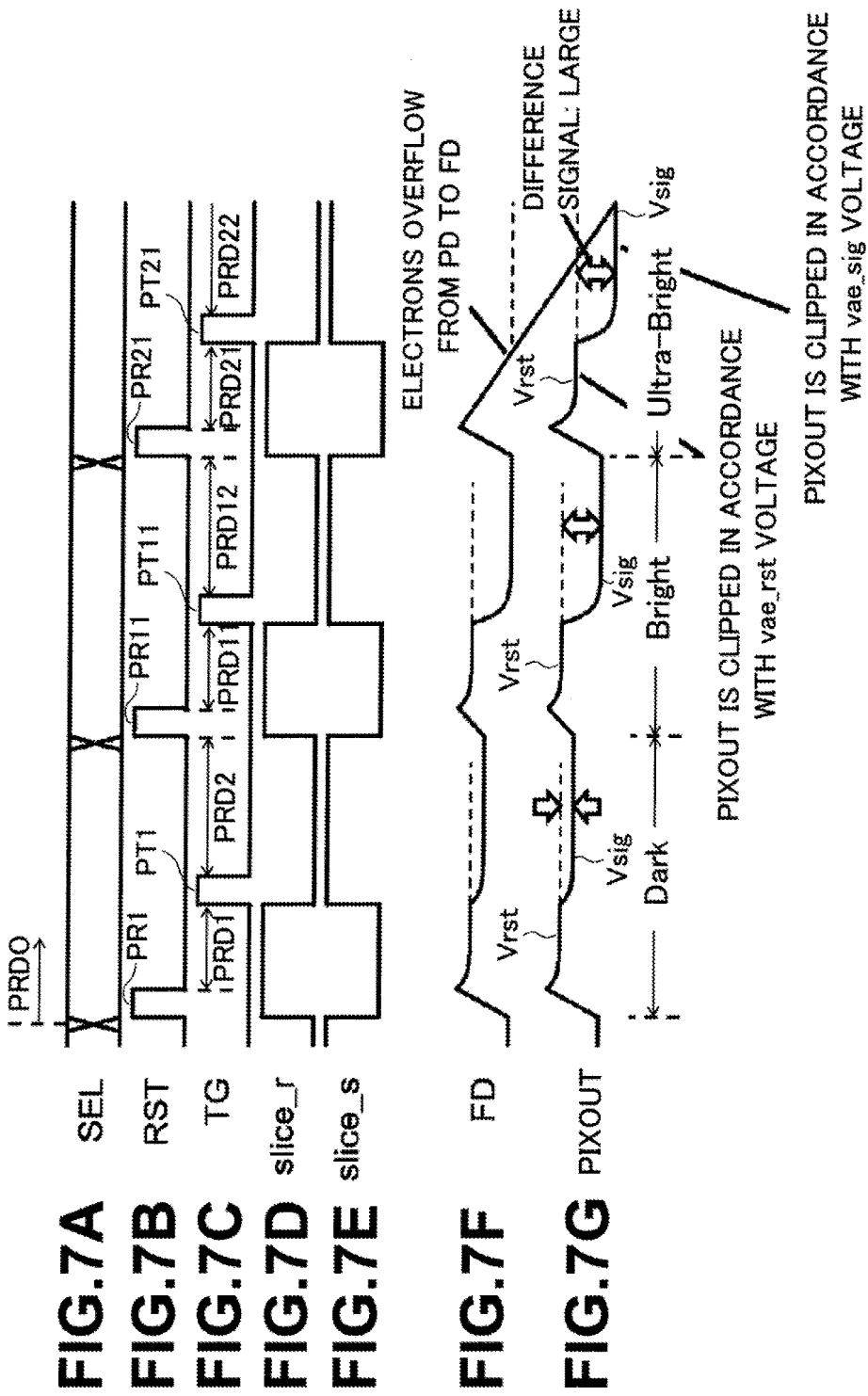

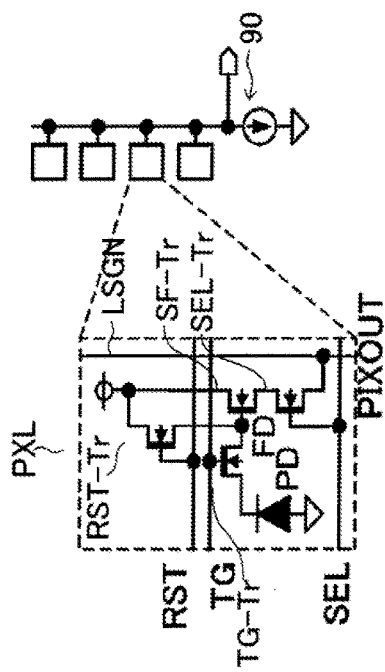
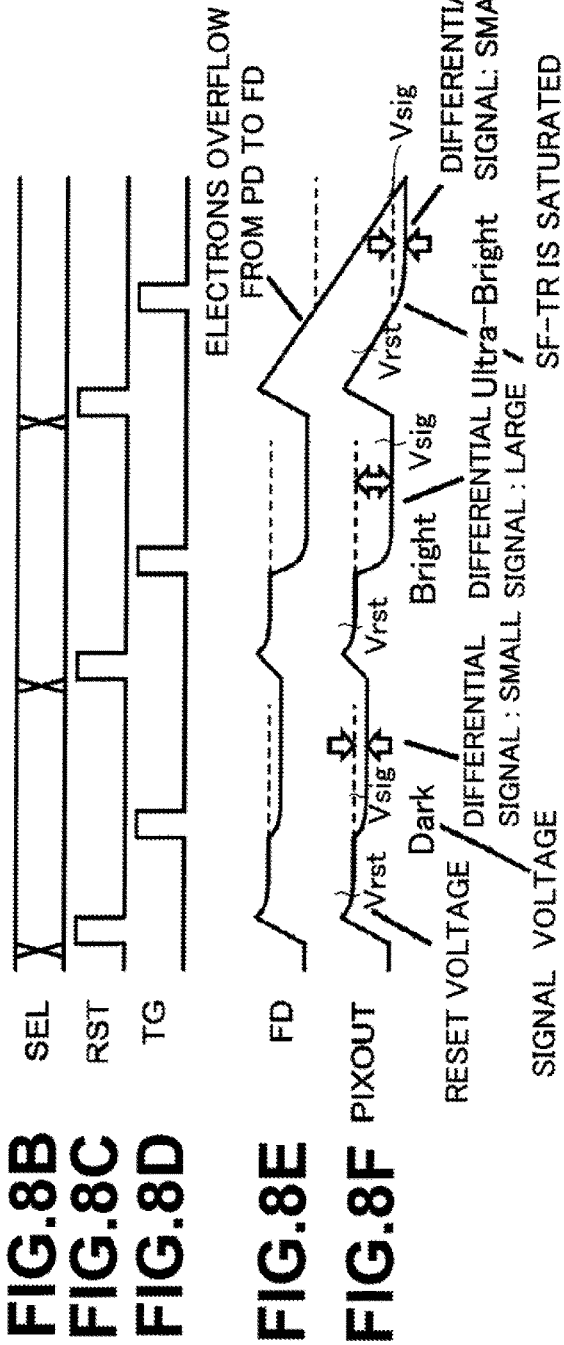
FIG. 8A
FIG. 8B
FIG. 8C
FIG. 8D
FIG. 8E
FIG. 8F

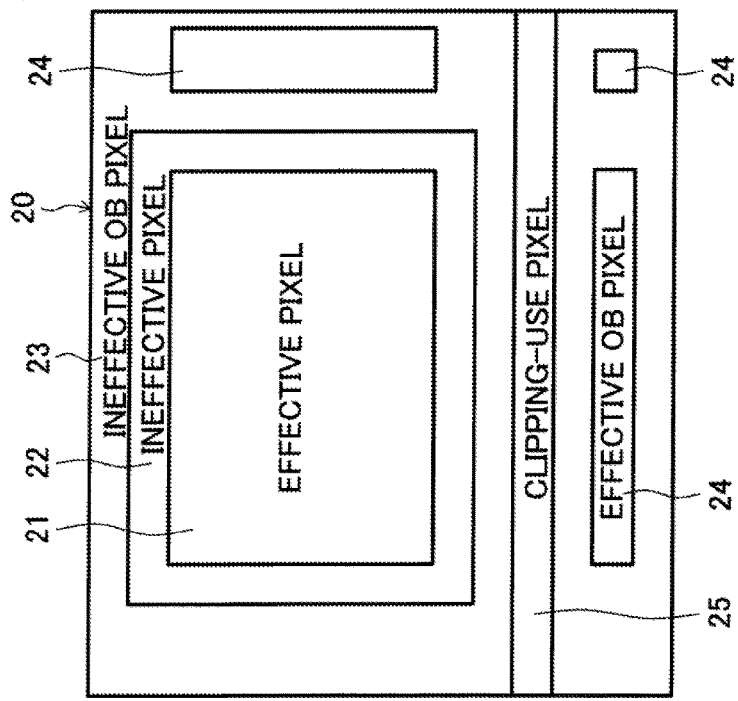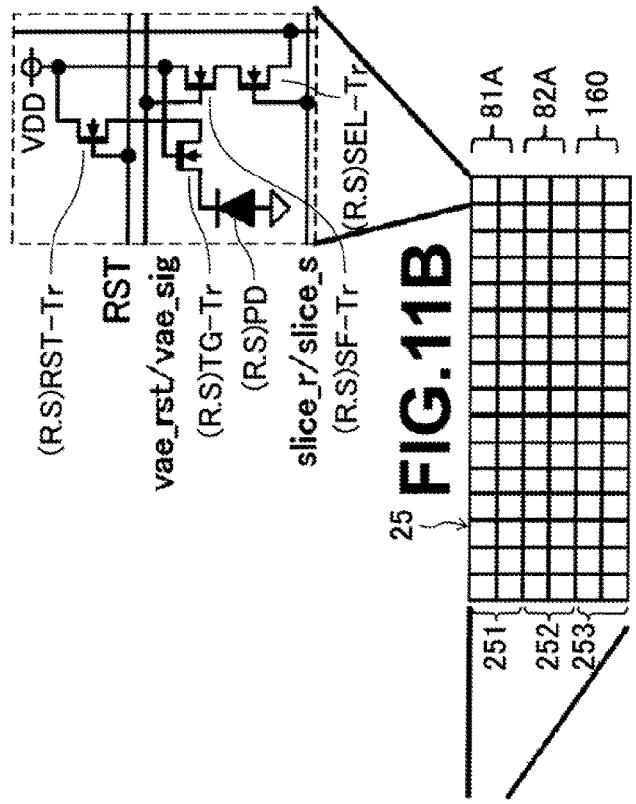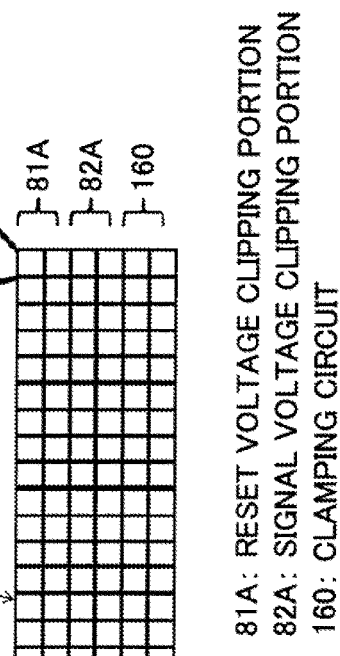

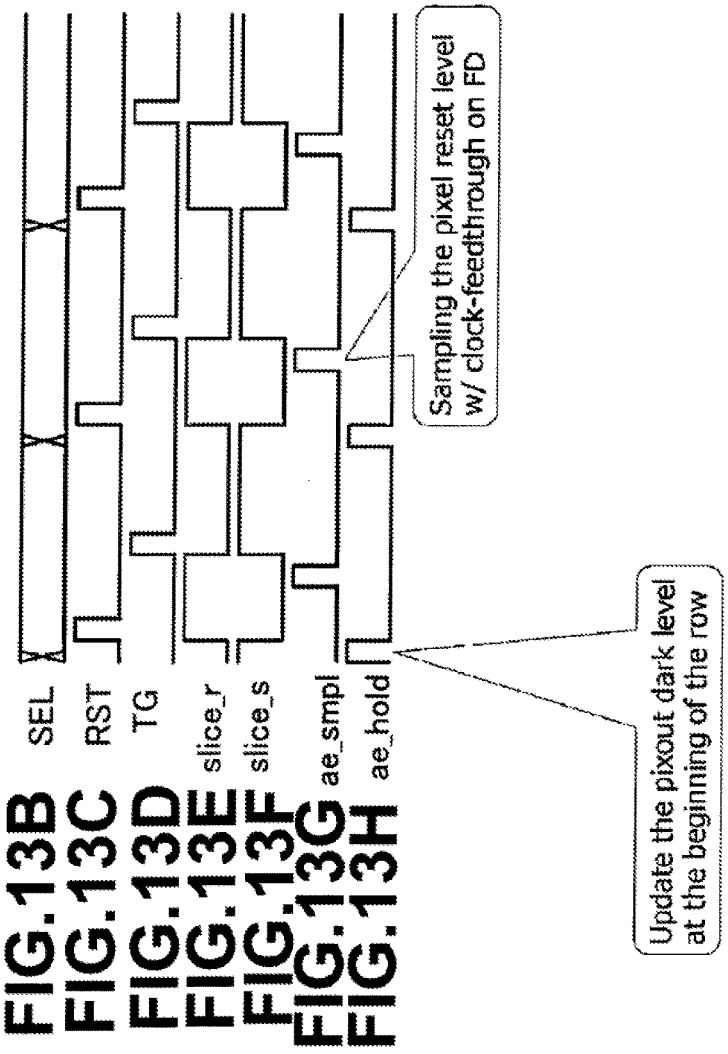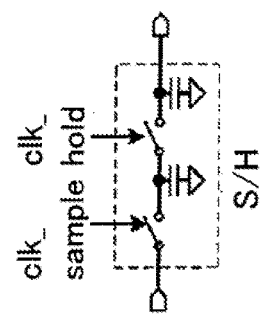

SOLID-STATE IMAGING DEVICE, METHOD FOR DRIVING SOLID-STATE IMAGING DEVICE, AND ELECTRONIC APPARATUS

CROSS REFERENCE TO RELATED APPLICATION

The present invention contains subject matter related to Japanese Patent Application JP 2015-123573 filed in the Japan Patent Office on Jun. 19, 2015, the entire contents of which being incorporated herein by reference.

TECHNICAL FIELD

The present invention relates to a solid-state imaging device, a method for driving the solid-state imaging device, and an electronic apparatus.

BACKGROUND ART

As a solid-state imaging device (image sensor) using a photo-electric conversion element detecting light and generating a charge, a CMOS (Complementary Metal Oxide Semiconductor) image sensor has been put into practical use. CMOS image sensors have been widely applied as parts of digital cameras, video cameras, monitoring cameras, medical endoscopes, personal computers (PC), mobile phones and other portable terminals (mobile devices), and various other electronic apparatuses.

A CMOS image sensor has photodiodes (photo-electric conversion elements) and floating diffusion (FD) amplifiers having FD layers corresponding to the individual pixels. Readout is perfumed mainly by the column parallel output method of selecting one row of the pixel array and simultaneously reading out the pixels in the column output direction.

In this regard, as the configuration of a pixel, for example, 4-transistor (4Tr) configuration pixel which has, with respect to one photodiode (photo-electric conversion element), a transfer element comprised of a transfer transistor, a reset element comprised of a reset transistor, a source-follower element comprised of a source-follower transistor, and a selection element comprised of a selection transistor can be exemplified.

The transfer transistor is selected in a predetermined transfer period and beauties a conductive state, then transfers a charge (electrons) which is generated by photo-electric conversion and accumulated (stored) in the photodiode to the floating diffusion FD. The reset transistor is selected in a predetermined reset period and becomes a conductive state, then resets the floating diffusion FD to the potential of the power supply line. The selection transistor is selected at the time of a readout scan and becomes a conductive state. Due to this, the source-follower transistor outputs, to a vertical signal line, a readout signal of column output which is obtained by converting the charge in the floating diffusion FD to a voltage signal in accordance with the charge quantity (potential).

For example, in the readout scan period, after the floating diffusion FD is reset to for example the potential of the power supply line in the reset period, the charge in the floating diffusion FD is converted to a voltage signal in accordance with the charge quantity (potential). The result is output as a readout reset voltage Vrst to the vertical signal line by the source-follower transistor. Subsequently, in the predetermined transfer period, the charge (electrons) which is generated by photo-electric conversion and accmulated in the photodiode is transferred to the floating diffusion FD. Further, the charge in the floating diffusion FD is converted to a voltage signal in accordance with the charge quantity (potential) and is output as a readout signal voltage Vsig to the vertical signal line by the source-follower transistor. The output signal of the pixel is processed as a differential signal (Vsig−Vrst).

In a CMOS image sensor having such a pixel, however, the pixel output is saturated when very strong light strikes one or more pixels, therefore there is the disadvantage that a high luminance signal is erroneously output as a low luminance signal and so-called "inversion" video noise is output.

In order to solve this, there is proposed a pixel bias circuit provided with a clipping circuit as a voltage limiter which restricts an output voltage of a pixel when very strong light strikes one pixel or more and prevents inversion video noise from being output (see for example PLT 1).

CITATION LIST

Patent Literature

PLT 1. U.S. Pat. No. 7,825,982B2

SUMMARY OF INVENTION

Technical Problem

However, the clipping circuit disclosed in PLT 1, due to being arranged corresponding to an effective pixel region, there is the disadvantages that there are restrictions on the position of arrangement and circuit area, there is a large influence exerted on the effective pixel region and in turn reduction of the area of the chip is difficult, and the degree of freedom for designing the clipping circuit is small. Further in the clipping circuit disclosed in PLT 1, the control voltage of the clipping circuit is determined while considering the variation among chips, therefore there is the disadvantage that both reduction of voltage and prevention of inversion video noise (prevention of "sunspots") cannot be achieved.

The present invention provides a solid-state imaging device capable of reducing the area of a chip, enabling both reduction of voltage and prevention of inversion video noise, and consequently capable of realizing a higher quality of image, a method for driving the solid-state imaging device, and an electronic apparatus.

Solution to Problem

A solid-state imaging device of a first aspect of the present invention has a pixel portion in which pixels are arranged and a clipping circuit capable of clipping a pixel readout voltage read out from a pixel in accordance with a clipping voltage, wherein each pixel includes a photo-electric conversion element which accumulates a charge generated by photo-electric conversion in an accumulation period, a transfer element capable of transferring the charge accumulated in the photo-electric conversion element in a transfer period, a floating diffusion to which the charge accumulated in the photo-electric conversion element is transferred through the transfer element, a source-follower element which converts the charge of the floating diffusion to a voltage signal in accordance with the charge quantity, and a reset element which resets the floating diffusion to a predetermined potential in a reset period, and the clipping circuit is arranged in an ineffective pixel region in the pixel portion.

A second aspect of the present invention is a method for driving a solid-state imaging device having a pixel portion in which pixels are arranged, wherein each pixel includes a photo-electric conversion element which accumulates a charge generated by photo-electric conversion in an accumulation period, a transfer element capable of transferring the charge accumulated in the photo-electric conversion element in a transfer period, a floating diffusion to which the charge accumulated in the photo-electric conversion element is transferred through the transfer element, a source-follower element which converts the charge in the floating diffusion to a voltage signal in accordance with the charge quantity, and a reset element which resets the floating diffusion to a predetermined potential in a reset period, the method for driving a solid-state imaging device comprising clipping a pixel readout voltage read out from a pixel in accordance with a clipping voltage of a clipping element which is arranged in an inffective region in the pixel portion and is formed by an element having a characteristic equivalent to that of the source-follower element in the pixel.

An electronic apparatus according to a third aspect of the present invention has a solid-state imaging device and an optical system for forming an object image in the solid-state imaging device, wherein the solid-state imaging device has a pixel portion in which pixels are arranged and a clipping circuit capable of clipping a pixel readout voltage read out from a pixel in accordance with a clipping voltage, each pixel includes a photo-electric conversion element which accumulates a charge generated by photo-electric conversion in an accumulation period, a transfer element capable of transferring the charge accumulated in the photo-electric conversion element in a transfer period, a floating diffusion to which the charge accumulated in the photo-electric conversion element is transferred through the transfer element, a source-follower element which converts the charge of the floating diffusion to a voltage signal in accordance with the charge quantity, and a reset element which resets the floating diffusion to a predetermined. potential in a reset period, and the clipping circuit is arranged in an ineffective pixel region in the pixel portion.

Advantageous Effects of Invention

According to the present invention, the area of the chip can be reduced, both reduction of voltage and prevention of inversion video noise are possible, and consequently a higher quality of image can be realized.

BRIEF DESCRIPTION OF DRAWINGS

FIG. 3A and FIG. 3B are diagrams showing operation timings of a shutter scan and readout scan at the time of usual readout operation in the present embodiment.

FIG. 7A to FIG. 7G are diagrams for explaining readout operations at the time of a dark state (low luminance), bright state (high luminance), and ultra-bright state (ultra-high luminance) in a readout scan period in a case where the clipping circuit according to the first embodiment is applied.

FIG. 8A to FIG. 8F are diagrams for explaining readout operations at the time of a dark state (low luminance), bright state (high luminance), and ultra-bright state (ultra-high luminance) in a readout scan period in a case of a comparative example where the clipping circuit according to the first embodiment is not applied.

FIG. 11A to FIG. 11C are diagrams for explaining an example of the configuration and example of arrangement of a clipping circuit according to a second embodiment of the present invention.

FIG. 13A to FIG. 13H are diagrams showing an example of clock timings of readout processing including a sample/hold (S/H) circuit.

DESCRIPTION OF EMBODIMENTS

Below, embodiments of the present invention will be explained with reference to the drawings.

First Embodiment

Figure 1:
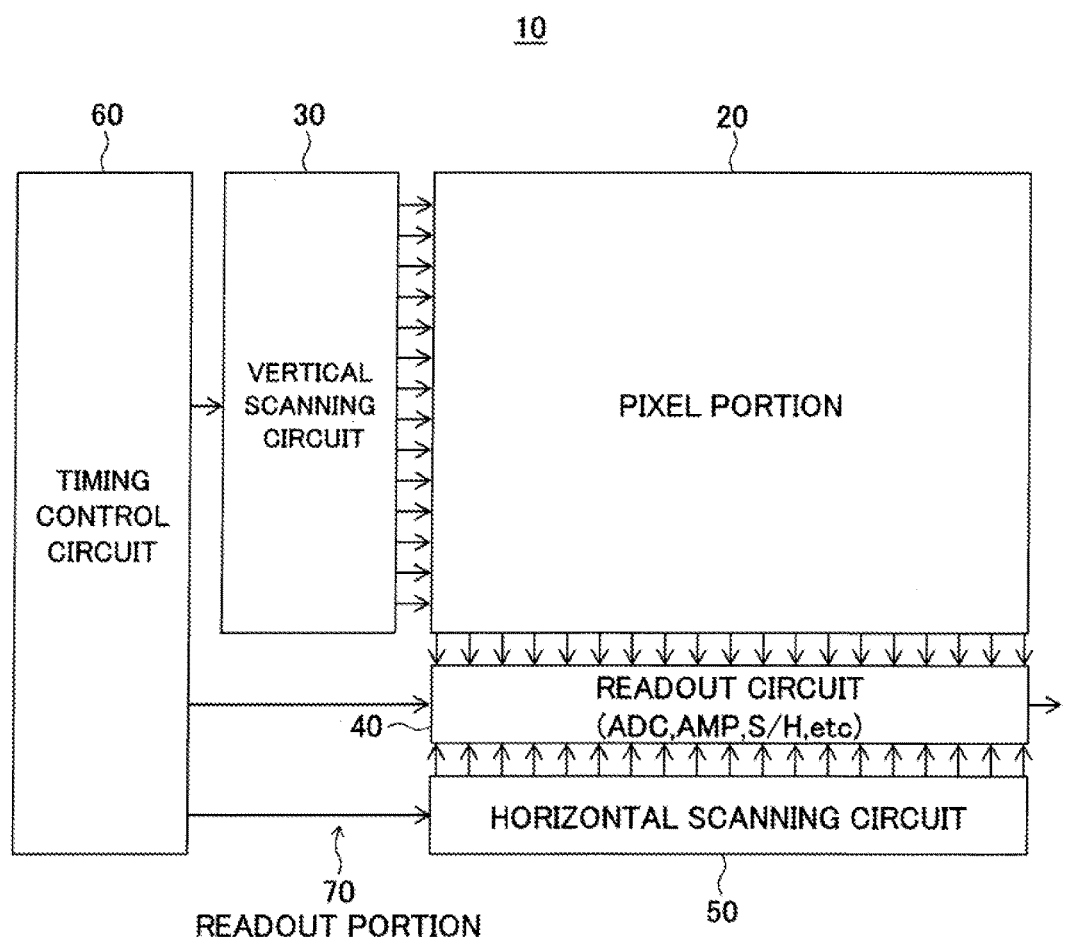
FIG. 1 is a block diagram showing an example of the configuration of a solid-state imaging device according to a first embodiment of the present invention.

FIG. 1 is a block diagram showing an example of the configuration of a solid-state imaging device according to a first embodiment of the present invention. In the present embodiment, a solid-state imaging device 10 is configured by for example a CMOS image sensor.

This solid-state imaging device 10, as shown in FIG. 1, has an imaging portion comprised of a pixel portion 20, a vertical scanning circuit (row scanning circuit) 30, a readout circuit (column readout circuit) 40, a horizontal scanning circuit (column scanning circuit) 50, and a timing control circuit 60 as principal components. Among these components, for example the vertical scanning circuit 30, readout circuit 40, and timing control circuit 60 are used to configure a readout portion 70 of a pixel signal.

In the present embodiment, in the solid-state imaging device 10, as will be explained later, in an ineffective region of the pixel portion 20, a clipping circuit capable of clipping a pixel readout voltage (reset voltage Vrst and signal voltage Vsig) read out from a pixel in accordance with a clipping voltage is arranged.

In the present embodiment, the readout portion 70 is configured so that, in one readout scan period, it can perform a first reading operation for reading the reset voltage Vrst in a first readout period following a reset period and a second reading operation for reading the signal voltage Vsig in accordance with an accumulated charge in the photo-electric conversion element in a second readout period after a transfer period performed after the first readout period following the reset period.

In the usual pixel readout operation, by driving by the readout portion 70, a shutter scan is carried out, then a readout scan is carried out. However, the first reading operation and second reading operation are carried out in the readout scan period.

Below, after explaining the configurations and functions of the portions of the solid-state imaging device 10 in brief, the configuration of the clipping circuit, the readout processing concerned with that, and so on will be explained in detail.

Configurations of Pixel Portion 20 and Pixel PXL

In the pixel portion 20, a plurality of pixels each including a photodiode (photo-electric conversion element) and a pixel amplifier are arranged in a two-dimensional matrix comprised of N rows and M columns.

Figure 2:
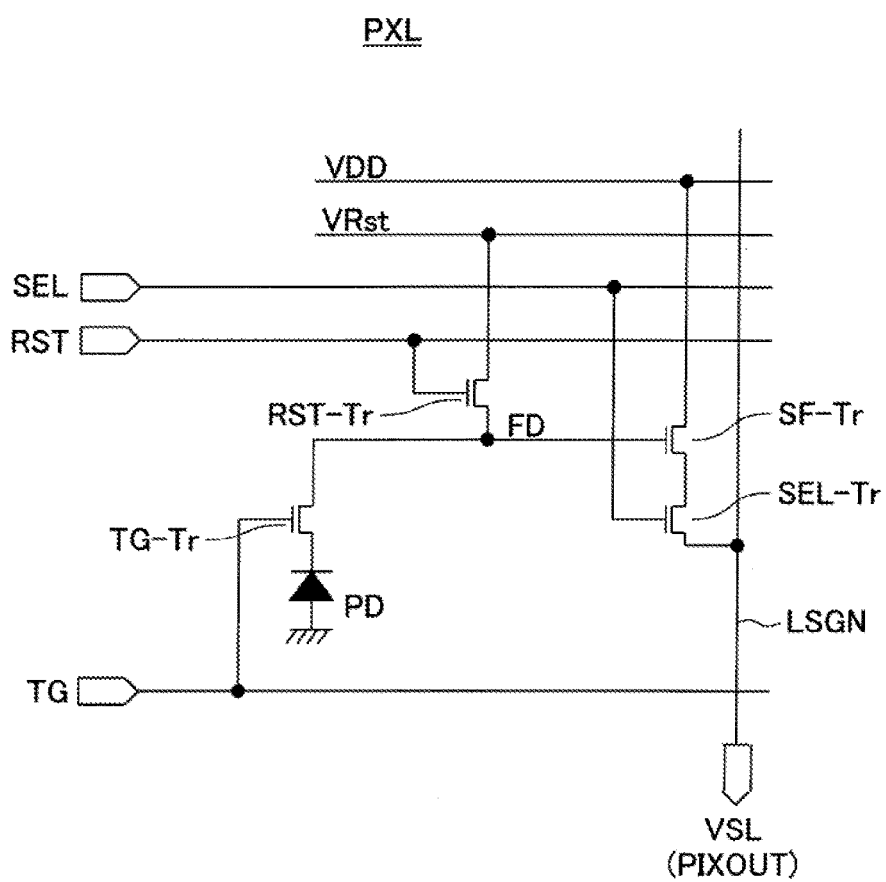
FIG. 2 is a circuit diagram showing an example of a pixel according to the first embodiment.

FIG. 2 is a circuit diagram showing an example of a pixel according to the present embodiment.

This pixel PXL has for example a photo-electric conversion element comprised of a photodiode (PD). For this photodiode PD, provision is made of a transfer element comprised of a transfer transistor TG-Tr, a reset element comprised of a reset transistor RST-Tr, a source-follower element comprised of a source-follower transistor SF-Tr, and a selection element comprised of a selection transistor SEL-Tr.

The photodiode PD generates a signal charge (electrons) of a quantity in accordance with incident light quantity and accumulates the same. Below, an explanation will be given of a case where the signal charge is comprised of electrons and each transistor is an n-type transistor. However, the signal charge may be a hole or each transistor may be a p-type transistor as well. Further, the present embodiment is effective even in a case where each transistor is shared among a plurality of photodiodes and a case where a three-transistor (3Tr) pixel not having a selection transistor is employed The transfer transistor TG-Tr is connected between the photodiode PD and the floating diffusion FD and is controlled through a control line TG. The transfer transistor TG-Tr is selected in a period where the control line TG is at a high level H and becomes a conductive state and transfers a charge (electrons) which is generated by photo-electric conversion and accumulated in the photodiode PD to the floating diffusion FD.

The reset transistor RST-Tr is connected between a power supply line VRst and the floating diffusion FD and is controlled through a control line RST. Note that, the reset transistor RST-Tr may be configured so that it is connected between a power supply line VDD and the floating diffusion FD and is controlled through the control line RST as well. The reset transistor RST-Tr is selected in the period where the control line RST is at the H level to become a conductive state and resets the floating diffusion FD to a potential of the power supply line VRst (or VDD).

The source-follower transistor SF-Tr and the selection transistor SEL-Tr are connected in series between the power supply line VDD and a vertical signal line LSGN. To a gate of the source-follower transistor SF-Tr, the floating diffusions FD is connected. The selection transistor SEL-Tr is controlled through a control line SEL. The selection transistor SEL-Tr is selected in the period where the control line SEL is at the H level and becalms a conductive state. Due to this, the source-follower transistor SF-Tr outputs a readout signal VSL of column output obtained by converting the charge of the floating diffusion FD to a voltage signal in accordance with the charge quantity (potential) to the vertical signal line LSGN. These operations are for example carried out simultaneously in parallel for each of one row's worth of the pixels since gates of the transfer transistor TG-Tr, reset transistor RST-Tr, and the selection transistor SEL-Tr are connected in units of rows.

In the pixel portion 20, pixels PXL are arranged in N rows and M columns therefore the number of each of the control lines SEL, RST, and TG is N, and the number of the vertical signal lines LSGN is M. In FIG. 1, each of the control lines SEL, RST, and TG is expressed as one row scanning control line.

The vertical scanning circuit 30 drives pixels through the row scanning control line in the shutter row and readout row in accordance with the control of the timing control circuit 60. Further, the vertical scanning circuit 30 outputs a row selection signal having a row address of a read row for reading out the signal and a shutter row for resetting the charge accumulated in the photodiode PD according to the address signal.

As explained above, in the usual pixel readout operation, by driving by the vertical scanning circuit 30 of the readout portion 70, the shutter scan is carried out, then the readout scan is carried out.

FIG. 3A and FIG. 3B are diagrams showing operation timings of the shutter scan and the readout scan at the time of the usual pixel readout operation in the present embodiment. FIG. 3A, shows the relationships among the shutter scan, exposure period, and readout scan, and FIG. 3B shows concrete operation timings of the shutter scan and readout scan.

The control line SEL which controls the ON (conductive) and OFF (nonconductive) states of the selection transistor SEL-Tr is set at an L level in the shutter scan period PSHT so that the selection transistor SEL-Tr is held in the nonconductive state, while is set at an H level in the readout scan period PRDO so that the selection transistor SEL-Tr is held in the conductive state. Further, in the shutter scan period PSHT, the control line TG is set at an H level in the predetermined period for the period where the control line RST is at an H level, and the photodiode PD and floating diffusion FD are reset through the reset transistor RST-Tr and transfer transistor TG-Tr.

In the readout scan period PRDO, the control line RST is set at the H level, the floating diffusion FD is reset through the reset transistor RST-Tr, and a reset voltage Vrst comprised of a pixel readout voltage in the reset state is read out in a first readout period PRD1 after this reset period PR. After the readout period PRD1, for the predetermined period, the control line TG is set at an H level, the accumulated charge in the photodiode PD is transferred through the transfer transistor TG-Tr to the floating diffusion FD, and a signal voltage Vsig comprised of a pixel readout voltage in accordance with the accumulated electrons (charge) is read cut in a second readout period PRD2 after this transfer period PT.

Note that, in the use pixel readout operation in the first embodiment, as shown in FIG. 3B, the accumulation period (exposure period) EXP is the period from when the control line TG is switched to the L level after resetting the photodiode PD and floating diffusion FD Airing the shutter scan period PSHT to when the control line TG is switched to the L level in order to end the transfer period PT during the readout scan period PRDO.

The readout circuit 40 may be configured so that it includes a plurality of column signal processing circuits (not shown) which are arranged corresponding to the column outputs of the pixel portion 20 and so that column parallel processing is possible in the plurality of column signal processing circuits.

The readout circuit 40 can be configured including a correlated double sampling (CDS) circuit and ADC (analog/digital converter: AD converter), amplifier (AMP), sample/hold (S/H) circuit, and so on.

Figure 4A:
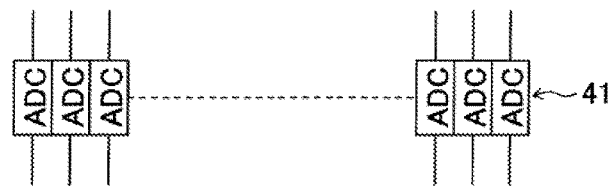
FIG. 4A to FIG. 4C are diagrams for explaining examples of the configuration of a readout system of column output of a pixel portion in the solid-state imaging device according to the embodiment of the present invention.
Figure 4B:
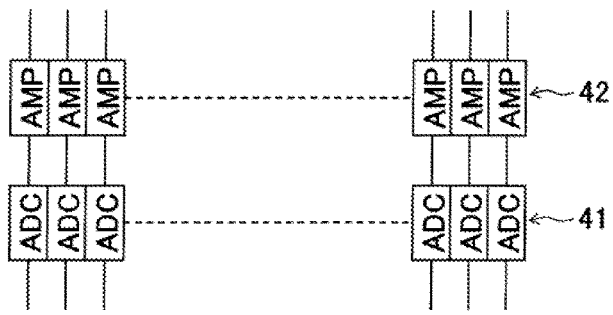
Figure 4C:
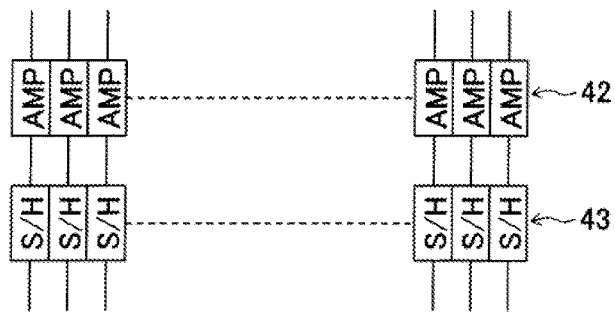

In this way, the readout circuit 40, for example as shown in FIG. 4A, may be configured by including an ADC 41 which converts a readout signal VSL of each column output of the pixel portion 20 to a digital signal. Otherwise, in the readout circuit 40, for example as shown in FIG. 4B, an amplifier (AMP) 42 for amplifying the readout signal VSL of each column output of the pixel portion 20 may be arranged. Further, in the readout circuit 40, for example as shown in FIG. 4C, a sample/hold (S/H) circuit 43 for sampling and holding the readout signal VSL of each column output of the pixel portion 20 may be arranged.

The horizontal scanning circuit 50 scans the signals processed in the ADC and other of the plurality of column signal processing circuits in the readout circuit 40, transfers the results in the horizontal direction, and outputs the same to a not shown signal processing circuit.

The timing control circuit 60 generates the timing signals which are necessary for the signal processing of the pixel portion 20, vertical scanning circuit 30, readout circuit 40, horizontal scanning circuit 50, and so on.

The configurations and functions of the different portions in the solid-state imaging device 10 were explained in brief above. Next, the configuration of a clipping circuit 80 according to the first embodiment and the readout processing etc. related with this will be explained in detail.

Figure 5:
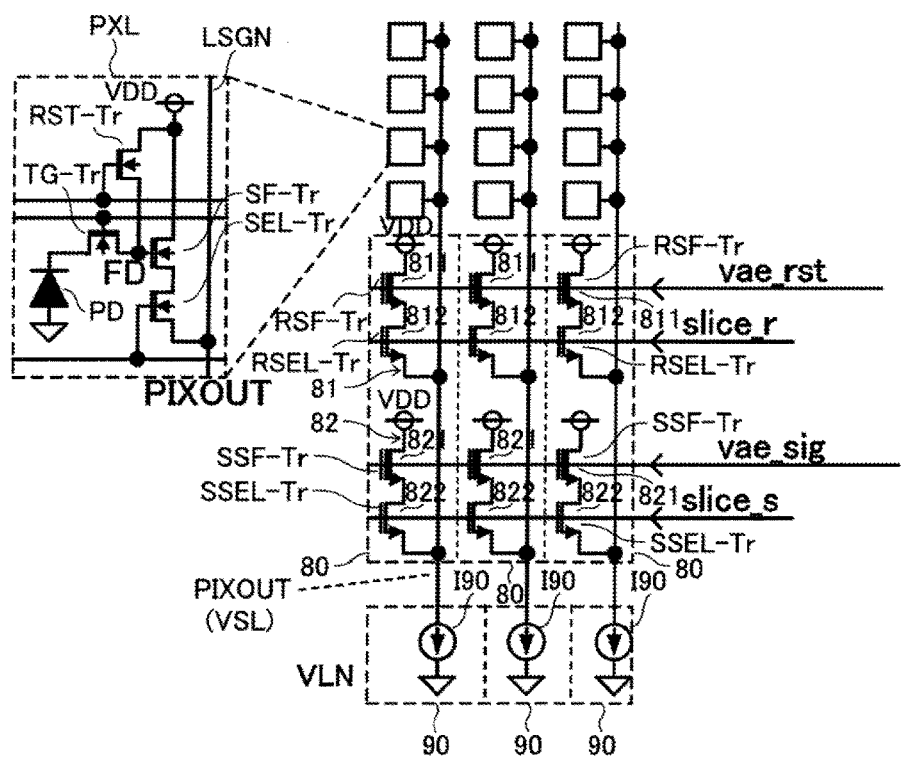
FIG. 5 is a diagram showing an example of the configuration of a pixel and clipping circuit according to a first embodiment of the present invention

FIG. 5 is a diagram showing an example of the configuration of a pixel and clipping circuit according to the first embodiment of the present invention.

The clipping circuit 80 is connected between a vertical signal line LSGN arranged in each column of the pixel array in the pixel portion 20 and a predetermined power supply, for example, the power supply line VDD. Each clipping circuit 80 arranged corresponding to each column is comprised of a pair of two circuits corresponding to the two readout voltages of the pixel PXL explained before, that is, the reset voltage Vrst and signal voltage Vsig. That is, each clipping circuit 80 arranged corresponding to each column is configured so as to include a reset voltage clipping portion 81 for clipping the reset voltage Vrst which is read out from the pixel PXL in the first readout period PRD1 and a signal voltage clipping portion 82 for clipping the signal voltage Vsig which is read out from the pixel PXL in the second readout period PRD2.

The clipping circuit 80 is provided so as to avoid erroneous output of a high luminance signal as a low luminance signal which occurs since the pixel output of the source-follower transistor SF-Tr and selection transistor SEL-Tr of the pixel PXL is saturated at the time of ultra-high luminance.

In the reset voltage clipping portion 81, a reset-use clipping element 811 and reset-use selection element 812 are connected in series between the vertical signal line LGSN which is arranged in each column the pixel array of the pixel portion 20 and a predetermined power supply for example, the power supply line VDD.

The reset-use clipping element 811 is formed by a reset-use source-follower transistor RSF-Tr comprised of an element having a characteristic equivalent to that of the source-follower transistor SF-Tr comprised of the source-follower element of the pixel PXL.

The reset-use selection element 812 is formed by a reset-use selection transistor RSEL-Tr comprised of an element having a characteristic equivalent to that of the selection transistor SEL-Tr comprised of the selection element of the pixel PXL.

Further, gates of the reset-use source-follower transistors RSF-Tr which are arranged corresponding to the columns are commonly connected to the supply line of a reset-use clipping voltage vae_rst which is set in advance. Gates of the reset-use selection transistors RSEL-Tr which are arranged corresponding to the columns are commonly connected to the supply line of a reset-use selection signal slice_r.

In the present embodiment, the reset-use selection signal slice_r is set at an active H level by the readout portion 70 in a reset period PR and first readout period PRD1 in the readout scan PRDO.

In this way, the reset voltage clipping portion 81 is configured so as to have a source-follower structure equivalent to the source-follower structure which is formed by the source-follower transistor SF-Tr and selection transistor SEL-Tr in the pixel PXL.

In a signal voltage clipping portion 82, a signal-use clipping element 821 and signal-use selection element 822 are connected in series between the vertical signal line LSGN which is arranged in each column in the pixel array of the pixel portion 20 and a predetermined power supply, for example, the power supply line VDD.

The signal-use clipping element 821 is formed by a signal-use source-follower transistor SSF-Tr comprised of an element having a characteristic equivalent to that of the source-follower transistor SF-Tr comprised of the source-follower element of the pixel PXL.

The signal-use selection element 822 is floured by a signal-use selection transistor SSEL-Tr comprised of an element having a characteristic equivalent to that of the selection transistor SEL-Tr comprised of the selection element of the pixel PXL.

Further, gates of the signal-use source-follower transistors SSF-Tr which are arranged corresponding to the columns are commonly connected to the supply line of signal-use clipping voltage vae_sig which is set in advance. Gates of the signal-use selection transistors SSEL-Tr Which are arranged corresponding to the columns are comely connected to the supply line of signal-use selection signal slice_s.

In the present embodiment, the signal-use selection signal slice_s is basically set at an active H level by the readout portion 70 in a second readout period PRD2 in the readout scan PRDO.

In this way, the signal voltage clipping portion 82 is basically configured so as to have a source-follower structure equivalent to the source-follower structure which is formed by the source-follower transistor SF-Tr and selection transistor SEL-Tr in the pixel PXL In this way, the reset voltage clipping portion 81 and signal voltage clipping portion 82 in the clipping circuit 80 in the present embodiment are configured so as to have source-follower structures equivalent to the source-follower structure which is formed by the source-follower transistor SF-Tr and selection transistor SEM-Tr in the pixel PXL. As a result, mismatch of clipping is reduced, a min of the clip level can be reduced, and consequently a reduction of voltage becomes possible.

Figure 6:
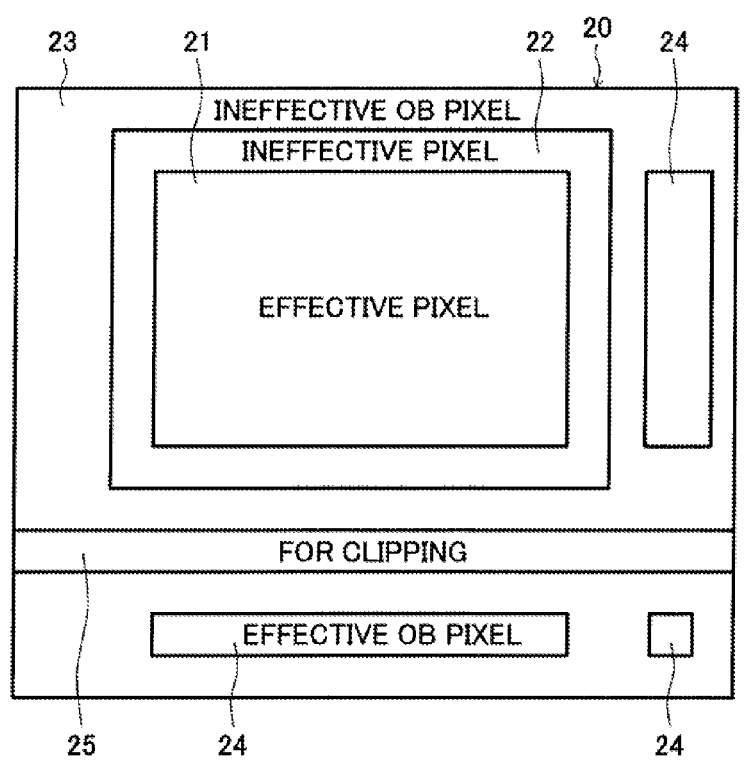
FIG. 6 is a diagram for explaining an arrangement of the clipping circuit in an ineffective region other than the effective pixels in the pixel portion.

Further, the clipping circuit 80 in the present embodiment is arranged in a so-called ineffective region other than the effective pixels in the pixel portion 20. FIG. 6 is a diagram for explaining the arrangement of the clipping circuit in an ineffective region other than the effective pixels in the pixel portion 20.

Usually, the pixel portion 20, as shown in FIG. 6, includes an effective pixel region 21 and an ineffective pixel region 22 around the effective pixel region 21, ineffective OB (optical black) pixel region 23 which is most of the remaining part, and effective OB pixel region 24. Further, the ineffective OB pixel region 23 is shielded by a light shielding film. In the present embodiment, the clipping circuit 80 is arranged in an ineffective region other than the effective pixels, for example, the ineffective pixel region 22 or ineffective OB pixel region 23. For example, as shown in FIG. 6, it is also possible to provide a dedicated region 25 for clipping in any area in the ineffective OB pixel region 23.

In this way, the clipping circuit 80 is arranged in an ineffective region such as the ineffective pixel region 22 or ineffective OB pixel region 23 which originally exist in the pixel portion 20, therefore there is the advantage that the restrictions with respect to the position of arrangement and circuit area can be reduced, the influence with respect to the effective pixel region 21 can be made as small as possible and in turn the area of the chip can be reduced and the degree of freedom for designing the clipping circuit increases.

The clipping circuit 80 having the above configuration is connected to the vertical signal line LSGN which is formed in each column in the pixel array. Further, to each vertical signal line LSGN, as shown in FIG. 5, a load circuit 90 is connected.

The load circuit 90 functions as a current sink for output of the pixel PXL. The load circuit 90 receives output voltages (signals) Vrst and Vsig of the pixel PXL and generates outputs corresponding to these voltage signals at a predetermined node. The load circuit 90 has a current source I90 which is formed by for example an MOS transistor and receives a control signal VLN at a gate. The control signal VLN is used for adjusting a bias current generated by the transistor configuring the current source I90 and optimizing the performance of the source-follower circuit for power consumption and speed. The transistor configuring this current source I90 is sometimes referred to as a "bias transistor".

Next, the readout operations at the time of a dark state (low luminance), bright state (high luminance), and ultra-bright state (ultra-high luminance) will be explained with reference to FIG. 7A to FIG. 7G in a case where the clipping circuit according to the present first embodiment is applied.

FIG. 7A to FIG. 7G are diagrams for explaining the readout operations at the time of a dark state (low luminance), bright state (high luminance), and ultra-bright state (ultra-high luminance) in the readout scan period in a case where the clipping circuit according to the present first embodiment is applied. FIG. 8A to FIG. 8F are diagrams for explaining the readout operations at the time of a dark state (low luminance), bright state (high luminance), and ultra-bright state (ultra-high luminance) in the readout scan period in a case of a comparative example where the clipping circuit according to the present first embodiment is not applied. FIG. 8A shows an equivalent circuit in the case where the clipping circuit is not applied, and FIG. 8B to FIG. 8F show the operation waveforms thereof.

In a dark state (low luminance) in the readout scan period PRDO, as shown in FIG. 7A, in order to select one row in the pixel array, the control line SEL which is connected to each pixel PXL in that selected row is set at an H level and the selection transistor SEL-Tr of the pixel PXL becomes a conductive state. In this selection state, as shown in FIG. 7B, in the reset period PR1, the reset transistor RST-Tr is selected in the period where the control line RST is at an H level and becomes a conductive state. As shown in FIG. 7F, the floating diffusion FD is reset to the potential of the power supply line VDD. A period after this reset period PR1 has passed (reset transistor RST-Tr is in a nonconductive state) up to when the transfer period PT1 is started becomes the first readout period PRD1 for reading the reset voltage Vrst at the time of the reset state.

For the reset period PR1 and first readout period PRD1, as shown in FIG. 7D and FIG. 7E, the reset-use selection signal slice_r is set at an H level and the signal-use selection signal slice_s is set at an L level. Due to this, in the reset period PR1 and first readout period PRD1, the reset voltage clipping portion 81 in the clipping circuit 80 becomes active, and the signal voltage clipping portion 82 in the clipping circuit 80 becomes non-active.

As explained above, the reset voltage Vrst comprised of the pixel readout voltage in the reset state is read out through the vertical signal line LSGN in the first readout period PRD1 after the reset period PR1. At this time, the reset voltage Vrst is at a higher level than the level at which clipping should be carried out, therefore it is not clipped at the reset voltage clipping portion 81, but is supplied through the load circuit 90 to the readout circuit 40, then is for example held.

Here, the first readout period PRD1 ends and the transfer period PT1 starts. As shown in FIG. 7C, in the transfer period PT1, the transfer transistor TG-Tr is selected in the period where the control line TG is at a high level H and becomes a conductive state, and the charge (electrons) which is generated by photo-electric conversion and accumulated in the photodiode PD is transferred to the floating diffusion PD. After this transfer period PT1 has passed (the transfer transistor TG-Tr is in a nonconductive state), the second readout period PRD2 for reading out the signal voltage Vsig in accordance with the charge which is generated by photo-electric conversion and accumulated in the photodiode PD starts.

In the transfer period PT1 and second readout period PRD2, as shown in FIG. 7D and FIG. 7E, the reset-use selection signal slice_r is set at an L level and the signal-use selection signal slice_s is set at an H level. Due to this, in the transfer period PT1 and second readout period PRD2, the reset voltage clipping portion 81 in the clipping circuit 80 becomes a non-active state and the signal voltage clipping portion 82 in the clipping circuit 80 becomes active.

As explained above, in a predetermined period after the first readout period PRD1, the control line TG is set at an H level and the accumulated charge in the photodiode PD is transferred through the transfer transistor TG-Tr to the floating diffusion FD, then the signal voltage Vsig comprised of the pixel readout voltage in accordance with the electrons (charge) accumulated in the second readout period PRD2 after this transfer period PT1 is read out. At this time, the signal voltage Vsig is at a higher level than the level at which clipping should be carried out, therefore it is not clipped by the signal voltage clipping portion 82, but is supplied through the load circuit 90 to the readout circuit 40, then is for example held.

Further, for example, in the readout circuit 40 configuring a portion of the readout portion 70, a difference (Vsig–Vrst) between the signal voltage Vsig which is read out in the second readout period PRD2 and the reset voltage Vrst which is read out in the first readout period PRD1 is taken, then CDS processing is carried out. In the case of a dark state (low luminance), the luminance is low, so the pixel output is not saturated, therefore a low luminance signal is output as the low luminance signal without erroneous output and the difference (Vsig–Vrst) is small.

The readout operation at the time of a bright state (high luminance) which is carried out in the reset period PR11, first readout period PRD11, transfer period PT11, and second readout period PRD12 is basically carried out in the same way as that in the case of a dark state (low luminance) described above. Accordingly, details thereof are omitted. In this case, because the luminance is high and the pixel output is not saturated, a high luminance signal is output as the high luminance output without erroneous output, and the difference (Vsig–Vrst) is larger than that at the time of low luminance. The readout operations at the time of a bright state (high luminance) and dark state (low luminance) are basically carried out in the same way as those in the case of FIG. 8 in which a clipping circuit is not provided.

Next, a readout operation at the time of the ultra-bright state (ultra-high luminance) will be explained.

In the ultra-bright state (ultra-high luminance) in the readout scan period PRDO, as shown in FIG. 7A, in order to select one row in the pixel array, the control line SEL connected to each pixel PXL in that selected row is set at an H level and the selection transistor SEL-Tr of the pixel PXL becomes a conductive state. In this selection state, as shown in FIG. 7B, in the reset period PR21, the reset transistor RST-Tr is selected in the period where the control line RST is at an H level and becomes a conductive state, and the floating diffusion FD is reset to the potential of the power supply line VDD as shown in FIG. 7F. The period from when this reset period PR21 has passed (the reset transistor RST-Tr is in a nonconductive state) to when the transfer period PT21 is started becomes the first readout period PRD21 for reading out the reset voltage Vrst at the time of the reset state.

This example shows the time of ultra-high luminance. Therefore, in the first readout period PRD21 etc., sometimes the charge (electrons) accumulated in the photodiode PD of the pixel PXL, overflows to the floating diffusion FD, and the source-follower transistor SF-Tr having the gate connected to the floating diffusion FD is saturated.

In the reset period PR21 and first readout period PRD21, as shown in FIG. 7D and FIG. 7E, the reset-use selection signal slice_r is set at an H level, and the signal-use selection signal slice_s is set at an L level. Due to this, in the reset period PR21 and first readout period PRD21, the reset voltage clipping portion 81 in the clipping circuit 80 becomes active, and the signal voltage clipping portion 82 in the clipping circuit 80 becomes non-active.

As explained above, the reset voltage Vrst comprised of the pixel readout voltage in a reset state is read out through the vertical signal line LSGN in the first readout period PRD21 after the reset period PR21. At this time, if the reset voltage Vrst is at a level exceeding the level at which clipping should be carried out, it is clipped in accordance with the reset-use clipping voltage vae_rst in the reset voltage clipping portion 81 and is supplied through the load circuit 90 to the readout circuit 40, then is, for example, held.

Here, the first readout period PRD21 ends and the transfer period PT21 starts. As shown in FIG. 7C, in the transfer period PT21, the transfer transistor TG-Tr is selected in the period where the control line TG is at an H level and becomes a conductive state, and the charge (electrons) which is generated by photo-electric conversion and accumulated in the photodiode PD is transferred to the floating diffusion FD. After this transfer period PT21 has passed (the transfer transistor TG-Tr is in a nonconductive state), the second readout period PRD22 for reading the signal voltage Vsig in accordance with the charge which is generated by photo-electric conversion and accumulated in the photodiode PD starts.

In the transfer period PT21 and second readout period PRD22, as shown in FIG. 7D and FIG. 7E, the reset-use selection signal slice_r is set at an L level and the signal-use selection signal slice_s is set at an H level. Due to this, in the transfer period PT21 and second readout period PRD22, the reset voltage clipping portion 81 in the clipping circuit 80 becomes non-active, and the signal voltage clipping portion 82 in the clipping circuit 80 becomes active.

As explained above, in a predetermined period after the first readout period PRD21, the control line TG is set at an H level and the accumulated charge in the photodiode PD is transferred through the transfer transistor TG-Tr to the floating diffusion FD, then the signal voltage Vsig comprised of the pixel readout voltage in accordance with the electrons (charge) accumulated in the second readout period PRD22 after this transfer period PT21 is read out. At this time, the signal voltage Vsig is at a level exceeding the level at which it should be clipped. Therefore, it is clipped in accordance with the signal-use clipping voltage vae_sig in the signal voltage clipping portion 82 and is supplied through the load circuit 90 to the readout circuit 40, then is, for example, held.

Further, for example, in the rebut circuit 40 configuring a portion of the readout portion 70, the difference (Vsig-Vrst) between the signal voltage Vsig read out in the second readout period PRD22 and the reset voltage Vrst read out in the first readout period PRD21 is taken, then CDS processing is carried out.

In the case of this ultra-bright state (ultra-high luminance), because the luminance is ultra-high and, even if the pixel output is saturated, the reset voltage Vrst and signal voltage Vsig are clipped to predetermined levels by the clipping circuit 80, the ultra-high luminance signal is output as an ultra-high luminance signal without erroneous output. In this case, the difference (Vsig–Vrst) is large.

Contrary to this, in the case where a clipping circuit is not provided, as shown in FIG. 8F, the ultra-high luminance signal is erroneously output as a low luminance signal since the pixel output is saturated, therefore it is difficult to prevent inversion video noise (prevent "sunspots").

Figure 9:
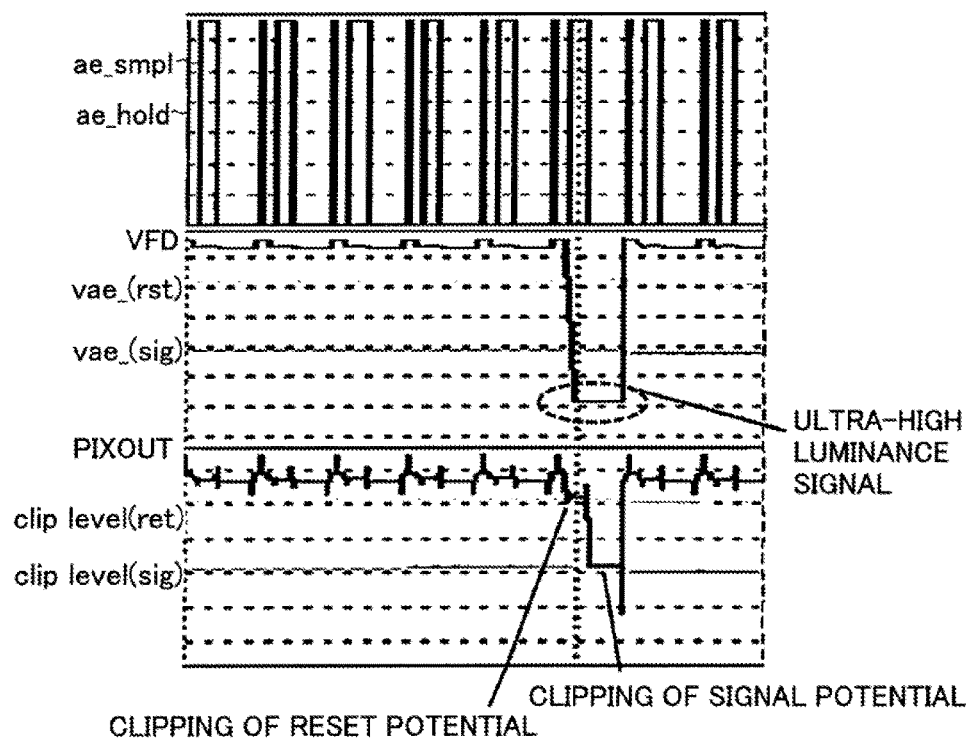
FIG. 9 is a diagram showing simulation results at the time of an ultra-bright state (ultra-high luminance) in a readout scan period in a case where the clipping circuit according to the first embodiment is applied.

FIG. 9 is a diagram showing results of simulation at the time of an ultra-bright state (ultra-high luminance) in the readout scan period in the case where the clipping circuit according to the first embodiment is applied.

According to the solid-state imaging device 10 in the present embodiment, in the case of an ultra-bright state (ultra-high luminance), because the luminance is ultra-high and even if the pixel output is saturated, the reset voltage Vrst and signal voltage Vsig are clipped to predetermined levels by the clipping circuit 80 as shown in FIG. 9, the ultra-high luminance signal is output as an ultra-high luminance signal without erroneous output.

As explained above, according to the first embodiment, the clipping circuit 80 is arranged in an ineffective region such as the ineffective pixel region 22 or ineffective CB pixel region 23 etc. which originally exist in the pixel portion 20, therefore there is the advantage that the restrictions with respect to the position of arrangement and circuit area can be reduced, the influence with respect to the effective pixel region 21 can be made as small as possible and in turn the area of the chip can be reduced and the degree of freedom for designing the clipping circuit increases. The reset voltage clipping portion 81 and signal voltage clipping portion 82 in the clipping circuit 80 of the first embodiment are configured so as to have source-follower structures equivalent to the source-follower structure which is formed by the source-follower transistor SF-Tr and selection transistor SEL-Tr in the pixel PCL. As a result, mismatch of clipping is reduced, a margin of the clip level can be reduced, and consequently a reduction of voltage becomes possible. Further, according to the first embodiment, there is the advantages that it becomes unnecessary to determine the clipping voltage as the control voltage of de clipping circuit while considering variation among chips, both a reduction of voltage and prevention of inversion video noise (prevention of "sunspots") can be realized, and consequently a higher quality of image can be realized.

Second Embodiment

Figure 10:
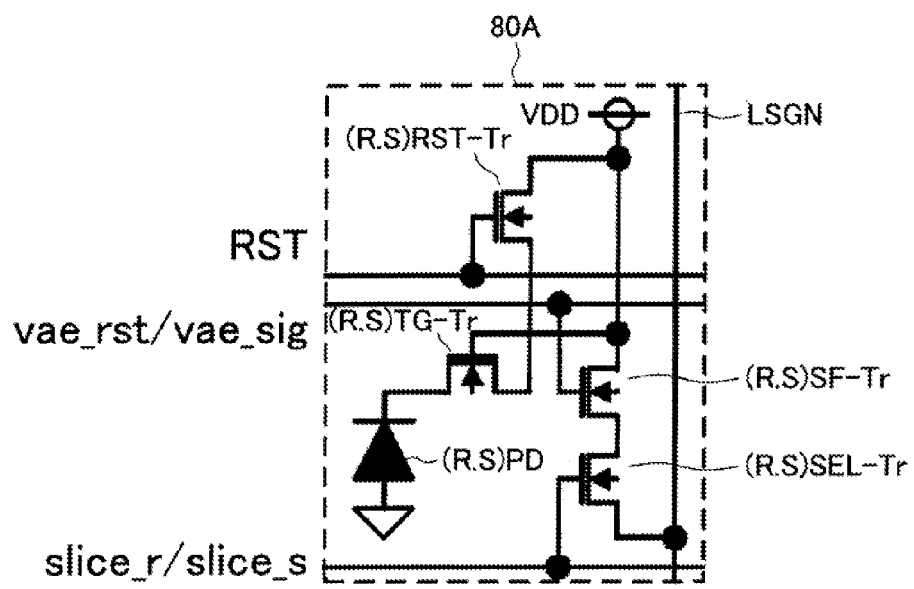
FIG. 10 is a diagram showing an example of the configuration of a clipping circuit according to a second embodiment of the present invention.

FIG. 10 is a diagram showing an example of the configuration of a clipping circuit according to a second embodiment of the present invention. FIG. 11A to FIG. 11C are diagrams for explaining an example of the configuration and example of arrangement according to the second embodiment of the present invention.

The difference of the clipping circuit 80A in the second embodiment from the clipping circuit 80 in the first embodiment is as follows. The clipping circuit 80 in the first embodiment is configured so as to have a source-follower structure equivalent to the source-follower structure which is formed by the source-follower transistor SF-Tr and selection transistor SEL-Tr in the pixel PXL in order to reduce mismatch with an actual pixel.

Contrary to this, the clipping circuit 80A in the second embodiment not only has a source-follower structure equivalent to the source-follower structure which is formed by the source-follower transistor SF-Tr and selection transistor SEL-Tr in the pixel PXL, but also has a configuration which becomes substantially equivalent (substantially synchronous) with the pixel PXL as a whole so that it can further reduce mismatch, can reduce the margin of the clip level, and consequently can reduce the voltage.

That is the clipping circuit 80A not only has the reset and signal-use source-follower transistor (R,S)SEL-Tr and reset and signal-use selection transistor (R,S) SEL-Tr, but also the reset and signal-use photodiode (R,S)PD, reset and signal-use transfer transistor (R,S)TG-Tr, and reset and signal-use reset transistor (R,S)RST-Tr. The transfer transistor (R,S) TG-Tr and reset transistor (R,S)RST-Tr are connected in series between the power supply line VDD and the cathode (accumulation node side) of the photodiode (R,S)PD. Further, a gate of the transfer transistor (R,S)TG-Tr is connected to the power supply line VDD, while a gate of the reset transistor (R,S)RST-Tr is connected to the control line of the pixel PXL.

Further, the clipping circuit 8 the second embodiment, as shown in FIG. 11A and FIG. 11B, is formed by providing a dedicated region 25 for clipping in any area in the ineffective OB pixel region 23 in the pixel portion 20. In the example in FIG. 11A and FIG. 11B, in the ineffective OB pixel region 23, an area comprised of 6 rows and X (two or more) columns is assigned the dedicated region 25. The reset voltage clipping portion 81A is formed in an area 251 in the top two rows in the dedicated region 25, while the signal voltage clipping portion 82A is formed in an area 252 comprised of the next 2 rows. Further, in the example of FIG. 11A and FIG. 11B, a clipping circuit 160 explained later is formed in an area 253 comprised of the remaining two rows.

In this way, awarding to the second embodiment, in the same way as the first embodiment explained before, the clipping circuit 80A is arranged in the ineffective pixel region 22 or ineffective CB pixel region 23 or another ineffective region which originally exists in the pixel portion 20, therefore there is the advantage that the restrictions with respect to the position of arrangement and circuit area can be reduced, the influence with respect to the effective pixel region 21 can be made as small as possible and in turn the area of the chip can be reduced and the degree of freedom for designing the clipping circuit increases.

Further, according to the second embodiment, provision is made of not only a source-follower structure equivalent to the source-follower structure which is formed by the source-follower transistor SF-Tr and selection transistor SEL-Tr in the pixel PXL, but also a configuration which becomes substantially equivalent (substantially synchronous) with the pixel PXL. Therefore, mismatch is further reduced, the margin of the clip level can be reduced, and consequently reduction of voltage becomes possible.

Further, according to the second embodiment, use is made of a plurality of columns as the clipping circuit. Therefore, by this as well, mismatch is further reduced, the margin of the clip level can be reduced, and consequently reduction of voltage becomes possible.

Third Embodiment

Figure 12:
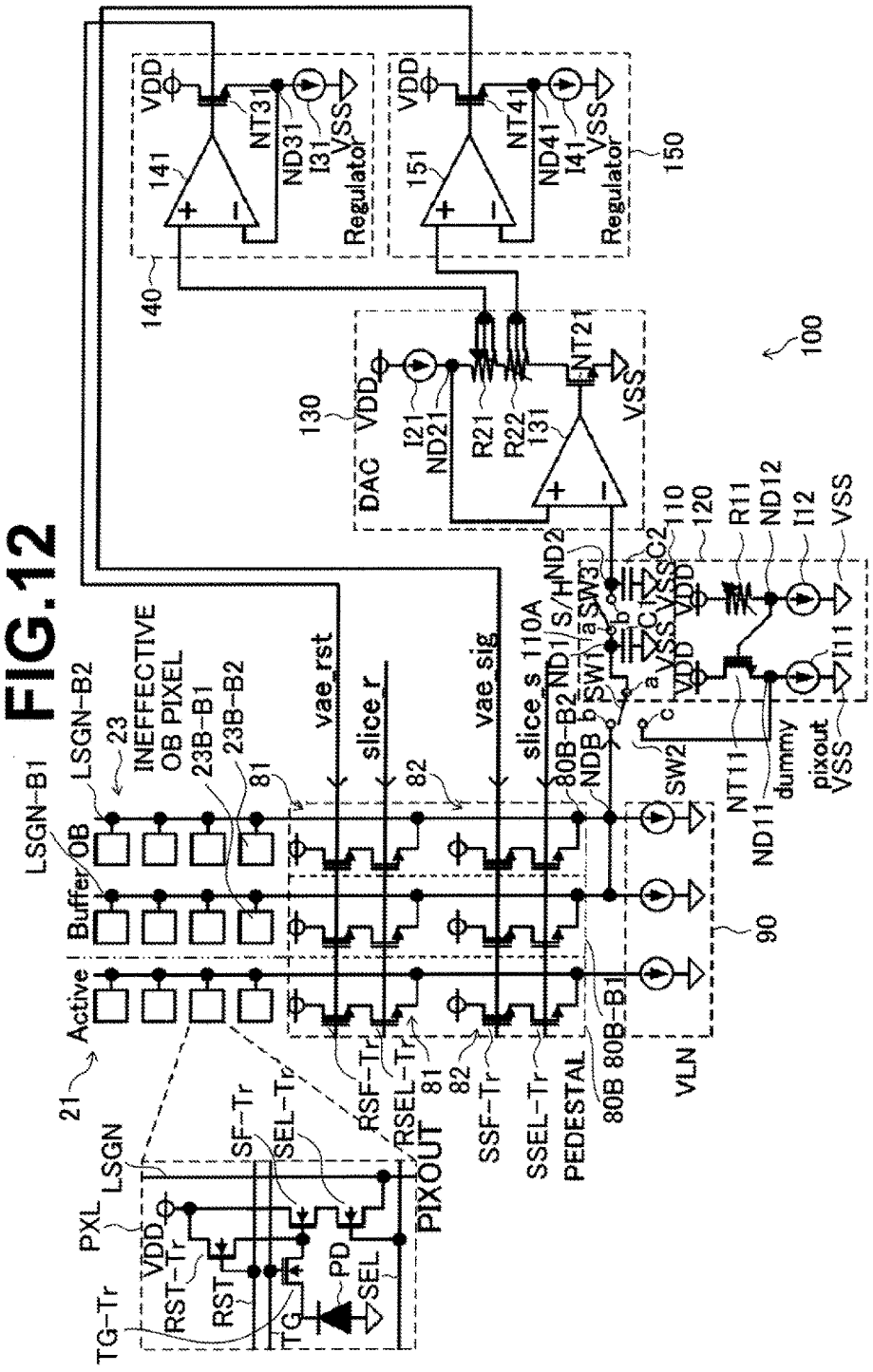
FIG. 12 is a diagram showing an example of the configuration of a pixel and clipping circuit according to a third embodiment of the present invention.

FIG. 12 is a diagram showing an example of the configuration of a pixel and a clipping circuit according to a third embodiment of the present invention.

The difference of the clipping circuit 80B in the third embodiment from the clipping circuits 80 and 80A in the first and second embodiments is as follows.

In the clipping circuits 80 and 80A in the first and second embodiments the reset-use clipping voltage vae_rst and signal-use clipping voltage vae_sig as the control voltages of clipping are set in advance as voltages suitable for clipping.

Contrary to this, the clipping circuit 80B in the third embodiment is provided with a clipping voltage control part 100 for detecting the reset voltage Vrst of the output voltage (readout voltage) of the pixel through the clipping circuit 80B to control the reset-use clipping voltage vae_rst and signal-use clipping voltage vae_sig and is configured so as to became insensitive with respect to variation among chips.

Further, in the third embodiment, the reset voltage Vrst to be detected is not the readout voltage which is output from the pixel PXL in the effective pixel region 21, but a voltage obtained by averaging the readout voltages Vrst output from the pixels PXL, in the ineffective OB pixel region 23 for a plurality of columns (two columns in the example in FIG. 12). Due to this, in the third embodiment, the configuration is made one where mismatch is reduced, the margin of the clip level can be reduced, and consequently reduction of voltage becomes possible. According to the third embodiment, the pixel output to be detected may be an ineffective pixel. In particular, by using only an ineffective OB pixel, the influence of voltage fluctuation due to ultra-high luminance light can be avoided.

FIG. 12 shows a configuration in which, basically, the clipping voltage control part 100 is provided with respect to the clipping circuit in FIG. 5.

The clipping voltage control part 100, as shown in FIG. 12, has a detection circuit 110, reset circuit 120, clip margin adjustment circuit 130, reset voltage-use clipping voltage generation part 140, and signal voltage-use clipping voltage generation part 150.

The detection circuit 110 detects a pixel readout voltage which is read out from the pixel (ineffective OB pixel in the example in FIG. 12) through the clipping circuit 80B and outputs the detected voltage to the clip margin adjustment circuit 130. The readout voltage Vrst which is input to the detection circuit 110 is the value of the outputs of the ineffective OB pixels in two columns, for example, two columns worth of the output voltages of the ineffective OB pixels 23B-B1 and 23B-B2, averaged. The ineffective CB pixel rows for outputting the voltage Vrst change in accordance with the selected row of the vertical scanning circuit 30. The averaging portion of the output voltages is configured by connecting vertical signal lines LSGN-B1 and LSGN-B2 forced by connection of ineffective CB pixels of two columns, while the averaged readout voltage Vrst from a connection node NDB thereof is input to the detection circuit 110.

The detection circuit 110, for example, as shown in FIG. 12, is configured by a sample/hold (S/H) circuit 110A. The S/H circuit 110A includes switches SW1, SW2, and SW3, capacitors C1 and C2, and nodes ND1 and ND2.

FIG. 13A to FIG. 13H are diagrams showing an example of clock timings of readout processing including the sample/hold (S/H) circuit.

The switches SW1 and SW2 are switched in connection between a common terminal "a" and a terminal "b" or terminal "c". The terminal "b" of the switch SW1 is connected to the connection node NDB of the vertical signal lines LSGN-B1 and LSGN-B2, while the terminal "a" is connected to a node ND1. The switch SW1 is turned on/off according to for example a sampling clock ae_smp1 (FIG. 13G). In the switch SW2, in order to reset the S/H circuit 110A for each frame, the terminal "c" is connected to the terminal "a" for each frame to connect the S/H circuit 110A to the reset circuit 120. The switch SW3 is connected in the terminal "a" to the node ND1 and is connected in the terminal "b" to a node ND2. The switch SW3 is turned on/off according to for example hold clock ae_hold (FIG. 13H).

The capacitor C1 is connected between the node ND1 and the reference potential VSS, while the capacitor C2 is connected between the node ND2 and the reference potential VSS. Further, the node ND2 is connected to the input unit of the clip margin adjustment circuit 130 in the next stage.

The S/H circuit 110A having such a configuration samples and holds the averaged readout voltage Vrst which is supplied from the connection node NDB of the vertical signal lines LSGN-B1 and LSGN-B2 and detects the readout voltage Vrst.

Note that, by forming it into low pass filter, the S/H circuit 110A can mitigate a reduction of the clipping voltage itself even if the pixel to be detected becomes saturated due to a device defect.

Figure 14:
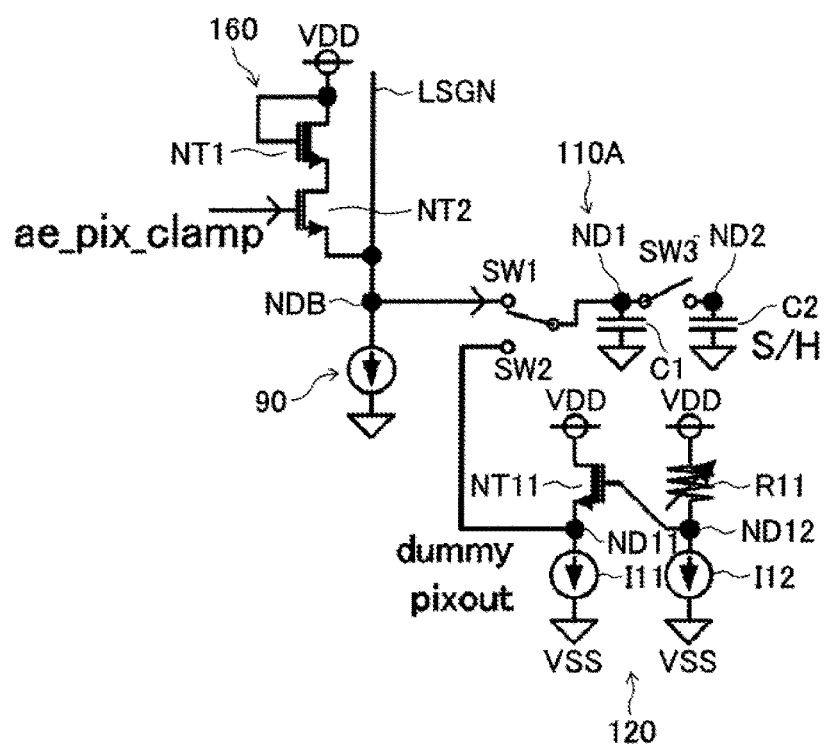
FIG. 14 is a diagram showing an example of the configuration including a clamping circuit for driving the sample/hold (S/H) circuit and a reset circuit.

Further, when turning on the power, the S/H circuit 110A is driven by using the clamping circuit 160 and can avoid dielectric breakdown due to a high impedance (HiZ). FIG. 14 is a diagram showing an example of the configuration including a clamping circuit for driving the sample/hold (S/H) circuit and a reset circuit.

In the clawing circuit 160, a transistor NT1 configured by NMOS's diode-connected and a selection transistor NT2 configured by NMOS are connected between the vertical signal line LSGN and the power supply line VDD.

At the time of turning on the power, the transistor NT2 is turned on by a signal ae_pix_clamp at first to output a fixed voltage to the vertical signal line LSGN and thereby drive the S/H circuit 110A. Due to this dielectric breakdown due to the high impedance (HiZ) of the S/H circuit 110A is avoided.

The reset circuit 120 is configured so that it can reset the S/H circuit 110A of the detection circuit 110. The reset circuit 120, as shown in FIG. 12 and FIG. 14, has an NMOS transistor NT11, variable resistance element R11, current sources I11 and I12, and nodes ND11 and ND12. The transistor NT11 and current source I11 are connected in series between the power supply line VDD and the reference potential VSS, while the node ND11 is formed by the connecting point of the source of the transistor NT11 with the current source I11. Further, the node ND11 is connected to the terminal "c" of the switch SW2. Further, the variable resistance element R11 and the current source I12 are connected in series between the power supply line VDD and the reference potential VSS, while the node ND12 is famed by the connecting point of the variable resistance element R11 and the current source I12. Further, the node ND12 is connected to a gate of the transistor NT11.

Figure 15:
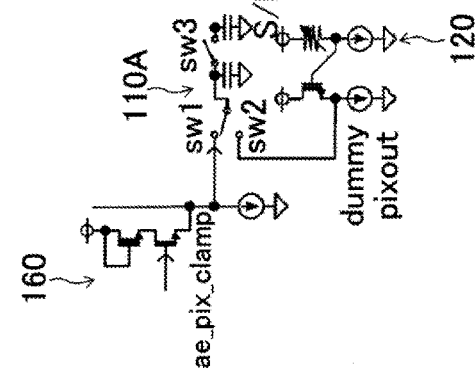
FIG. 15A and FIG. 15B are diagrams showing conditions etc. at the time of resetting of the sample/hold (S/H) circuit etc. as a table.

FIG. 15A and FIG. 15B are diagrams showing conditions etc. at the time of resetting etc. of the S/H circuit as a table. The reset circuit 120, as shown in FIG. 15A and FIG. 15B, discharges the charges in the capacitors C1 and C2 which are connected to the nodes ND1 and ND2 in a state where the switches SW2 and SW3 in the S/H circuit are ON. By resetting the S/H circuit 110A for the setup period for each frame, divergence by a positive feedback circuit can be prevented. Further, as explained above, at the time of activation such as time of turning on the power, in a state where the switches SW1 and SW3 are ON, voltage is given by the clamping circuit 160 to drive the S/H circuit 110A, thereby holding the S/H circuit 110A in a low impedance state. Due to this, dielectric breakdown due to high impedance (HiZ) can be avoided.

The clip margin adjustment circuit 130 adjusts the clip margin for the voltage detected by the S/H circuit 110A as the detection circuit 110 and supplies the adjusted voltage to the reset voltage-use clipping voltage generation part 140 and signal voltage-use clipping voltage generation part 150. In the third embodiment, by tracking an IR drop of the vertical signal line LSGN, it is possible to adjust the margin of the clip level to reduce it and it becomes possible to lower the voltage by this.

The clip margin adjustment circuit 130 has an operational amplifier 131, NMOS transistor NT21, variable resistance elements R21 and R22, current source I21, and node ND21.

In the clip margin adjustment circuit 130, the current source I21, variable resistance elements R21 and R22, and transistor NT21 are connected in series between the power supply line VDD and the reference potential VSS, while the node ND21 is formed by the connecting point of the current source I21 and the variable resistance element R21. In the operational amplifier 131, the inverted input terminal (−) is connected to the node ND2 of the S/H circuit 110A, the non-inverted input terminal (+) is connected to the node ND21, and the output is connected to a gate of the transistor NT21.

In the clip margin adjustment, circuit 130, the detection voltage from the S/H circuit 110A and the feedback voltage from the node ND21 from the output voltage are compared, then the gate voltage of the transistor NT21 is adjusted so that the difference becomes zero. Further, the detection voltage of the reset voltage adjusted by the amount of the clip margin is output to the reset voltage-use clipping voltage generation part 140. In the same way, the detection voltage of the signal voltage adjusted in the maximum signal amplitude and the amount of clip margin is output to the signal voltage-use clipping voltage generation part 150.

The reset voltage-use clipping voltage generation part 140 generates a reset-use clipping voltage vae_rst in accordance with the detection voltage of the reset voltage which is supplied from the clip margin adjustment circuit 130 and outputs the generated reset-use clipping voltage vae_rst to each of the gates of the reset-use source-follower transistors RSF-Tr of the reset voltage clipping portions 81 in the clipping circuits 80B-B1, 80B-B2, and 80B.

The reset voltage-use clipping voltage generation part 140 is configured by a regulator having an operational amplifier 141, NMOS transistor NT31, current source I31, and node ND31.

In the reset voltage-use clipping voltage generation part 140, the transistor NT31 and current source I31 are connected between the power supply line VDD and the reference potential VSS, and the node ND31 is formed by the connecting point of the source of the transistor NT31 with the current source I31. In the operational amplifier 141 the non-inverted input terminal (+) is connected to the supply line of the voltage in accordance with the detected voltage of the reset voltage of the clip margin adjustment circuit 130, and the inverted input terminal (−) is connected to the node ND31. Further, the output of the operational amplifier 141 is connected to a gate of the transistor NT31 and to the gates of the reset-use source-follower transistors RSF-Tr of the reset voltage clipping portions 81 in the clipping circuits 803-B1, 803-B2, and 80B. That is, the output of the operational amplifier 141 becomes the output part of the reset-use clipping voltage vae_rst.

In the reset voltage-use clipping voltage generation part 140, the output voltage from the clip margin adjustment circuit 130 and the feedback voltage from the node ND31 are compared, and the gate voltage of the transistor NT31 is adjusted so that the difference becomes zero.

In the reset voltage-use clipping voltage generation part 140, the transistor NT31 is formed by an NAM transistor as an element having a characteristic equivalent to that of the source-follower transistor SF-Tr of the pixel. Accordingly, the reset voltage-use clipping voltage generation part 140 functions as a circuit which shifts from the voltage (reset voltage) read out (output) from the source-follower transistor SF-Tr of the pixel PXL to the potential of the floating diffusion comprised of the input potential of the source-follower transistor SF-Tr.

The signal voltage-use clipping voltage generation part 150 generates the signal-use clipping voltage vae_sig in accordance with the detection voltage of the signal voltage supplied from the clip margin adjustment circuit 130 and outputs the generated signal-use clipping voltage vae_sig to the gates of the signal-use source-follower transistors SSF-Tr of the signal voltage clipping portions 82 in the clipping circuits 80B-B1, 80B-B2, and 80B.

The signal voltage-use clipping voltage generation part 150 is configured by a regulator having an operational amplifier 151 MOS transistor NT41, current source I41, and node ND41.

In the signal voltage-use clipping voltage generation part 150, the transistor NT41 and current source I41 are connected between the power supply line VDD and the reference potential VSS, while the node ND41 is formed by the connecting point of the source of the transistor NT41 with the current source I41. In the operational amplifier 151, the non-inverted input terminal (+) is connected to the supply line of the voltage in accordance with the detection voltage of the signal voltage of the clip margin adjustment circuit 130, while the inverted input terminal (−) is connected to the node ND41. Further, the output of the operational amplifier 151 is connected to a gate of the transistor NT41 and to the gates of the signal-use source-follower transistors SSF-Tr of the signal voltage clipping portions 82 in the clipping circuits 80B-B1, 80B-B2, and 80B. That is, the output of the operational amplifier 151 becomes the output part of the signal-use clipping voltage vae_sig.

In the signal voltage-use clipping voltage generation part 150, the output voltage from the clip margin adjustment circuit 130 and the feedback voltage from the node ND41 are compared, and the gate voltage of the transistor NT41 is adjusted so that the difference becomes zero.

In the signal voltage-use clipping voltage generation part 150, the transistor NT41 is formed by an NNW transistor as an element having a characteristic equivalent to that of the source-follower transistor SF-Tr of the pixel. Accordingly, the signal voltage-use clipping voltage generation part 150 functions as a circuit which shifts from the voltage (reset voltage) read out (output) from the source-follower transistor SF-Tr of the pixel PXL to the potential of the floating diffusion FD comprised of the input potential of the source-follower transistor SF-Tr.

In the above configuration as well, the operation at the time of the readout scan is carried out in the same way as the case of the configuration in FIG. 5, but the operation for strolling the clipping voltage by the clipping voltage control part 100 is newly carried out. Below, the operation for controlling the clipping voltage by the clipping voltage control part 100 will be explained in brief. In the following explanation, the processing at the time of turning on the power and time of resetting is omitted since it has been already explained in detail.

In the clipping voltage control part 100, the reset voltage Vrst comprised of the pixel readout voltage read out from the pixel (the ineffective OB pixel in the example in FIG. 12) through the clipping circuit 80B is detected. The readout voltage Vrst which is input to the detection circuit 110 is the value of the outputs of the ineffective OB pixels in two columns, for example, two columns worth of the output voltages of the ineffective OB pixels 23B-B1 and 23B-B2, averaged. The ineffective OB pixel rows change in accordance with the selected row of the vertical scanning circuit 30. In the detection circuit 110, the reset voltage Vrst is detected in the first readout period PRD1 at the time of readout scan. The reset voltage Vrst detected at the detection circuit 110 is supplied to the clip margin adjustment circuit 130.

In the clip margin adjustment circuit 130, the clip margin is adjusted with respect to the voltage detected by the detection circuit 110, then the adjusted voltage is supplied to the reset voltage-use clipping voltage generation part 140 and signal voltage-use clipping voltage generation part 150.

In the reset voltage-use clipping voltage generation part 140, the reset-use clipping voltage vae_rst is generated in accordance with the detection voltage of the reset voltage which is supplied from the clip margin adjustment circuit 130. In the reset voltage-use clipping voltage generation part 140, the reset-use clipping voltage vae_rst is generated so as to shift from the voltage (reset voltage) read out (output) from the source-follower transistor SF-Tr of the pixel PXL to the potential of the floating diffusion. FD comprised of the input potential of the source-follower transistor SF-Tr. Mainly, in the first readout period PRD1, the generated reset-use clipping voltage vae_rst is output to the gates of the reset-use source-follower transistors RSF-Tr of the reset voltage clipping portions 81 in the clipping circuits 80B-B1, 80B-B2, and 80B.

In the signal voltage-use clipping voltage generation part 150, the signal-use clipping voltage vae_sig which is set in accordance with the maximum signal amplitude supplied from the clip margin adjustment circuit 130 is generated. In the signal voltage-use clipping voltage generation part 150, the signal-use clipping voltage vae_sig is generated so as to shift from the voltage (reset voltage) read out (output) from the source-follower transistor SF-Tr of the pixel PXL to the potential of the floating diffusion FD comprised of the input potential of the source-follower transistor SF-Tr. Mainly, in the second readout period PRD2, the generated signal-use clipping voltage vae_sig is output to the gats of the signal-use source-follower transistor SSF-Tr of the signal voltage clipping portions 82 in the clipping circuits 80B-B1, 80B-B2, and 80B.

According to the third embodiment, not only can effects the same as those by the first and second embodiments explained above be obtained, but al so the following effects can be obtained. That is, according to the third embodiment, provision is made of the clipping voltage control part 100 which detects the reset voltage Vrst comprised of the output voltage (readout voltage) of the pixel through the clipping circuit 80B and controls the reset-use clipping voltage vae_rst and signal-use clipping voltage vae_sig, therefore it becomes insensitive with respect to variation among chips, the margin of the clip level can be reduced by tracking the IR drop of the vertical signal line LSGN, and reduction of voltage becomes possible. Further, in the third embodiment, the reset voltage Vrst to be detected is not the readout voltage which is output from the pixel PXL in the effective pixel region 21, but is value obtained by averaging the readout voltages Vrst output from the pixels PXL in the ineffective OB pixel region 23 for a plurality of columns. Due to this, in the third embodiment, mismatch is reduced, the margin of the clip level can be reduced, and consequently reduction of voltage becomes possible. According to the third embodiment, the pixel output detected may be an ineffective pixel. In particular, by using only an ineffective OB pixel, the influence by voltage fluctuation due to ultra-high luminance light can be avoided.

Further, by generating the clipping voltage by using an element having a characteristic equivalent to that of the source-follower transistor SF-Tr of the pixel, it becomes insensitive with respect to variation among chips, therefore the margin of the clip level can be reduced and reduction of voltage becomes possible.

Note that, by forming it into low pass filter, the S/H circuit 110A as the detection circuit can mitigate the reduction of the clipping voltage itself even if the pixel to be detected becomes saturated due to a device defect. Further, when turning on the power, the S/H circuit 110A is driven by using the clamping circuit and can avoid dielectric breakdown due to a high impedance (HiZ). By resetting the S/H circuit 110A for the setup period for each frame, divergence by the positive feedback circuit can be prevented.

Fourth Embodiment

Figure 16:
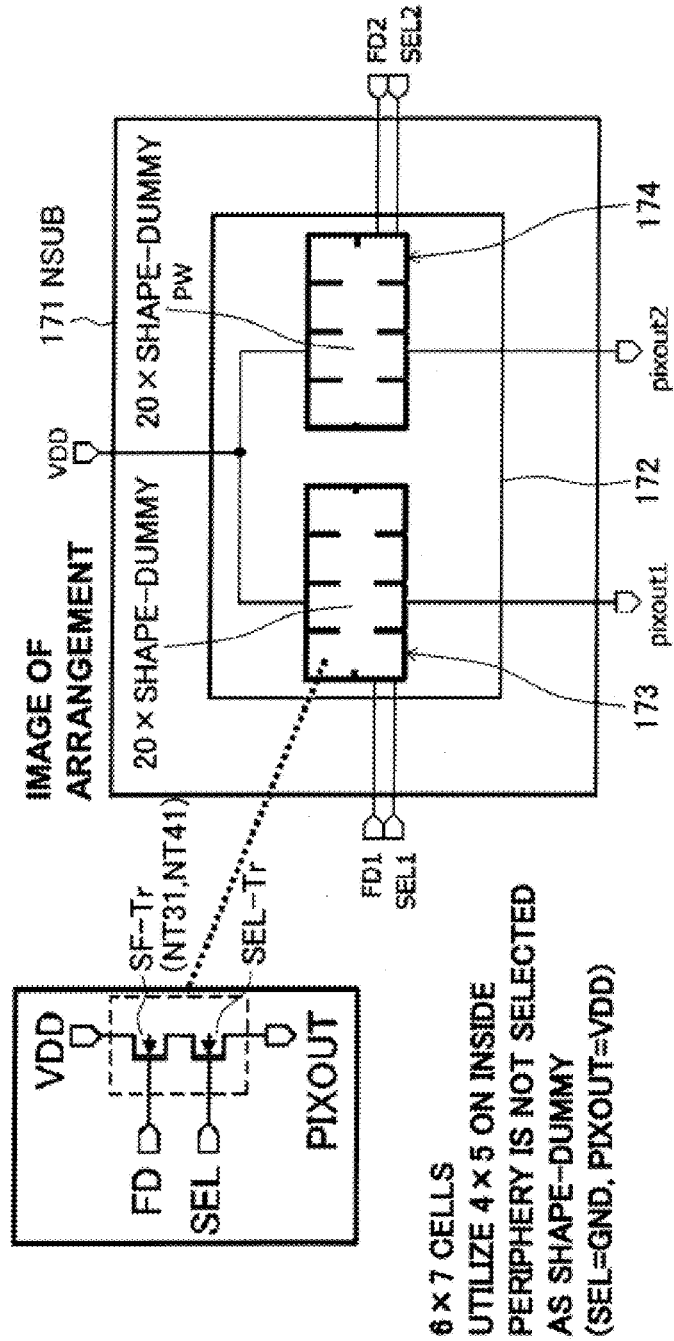
FIG. 16A and FIG. 16B are diagrams diagrammatically showing an example of the configuration of arrangement of a source-follower circuit of a regulator according to a fourth embodiment of the present invention.

FIG. 16A and FIG. 16B are diagrams diagrammatically showing an example of the configuration of arrangement of the source-follower circuit of a regulator according to a fourth embodiment of the present invention.

In the fourth embodiment, the variation is reduced by using a plurality of dummy pixel elements for the source-follower circuit used in the regulator.

As shown in FIG. 16A, a region 172 comprised of for example 6×7 cells is formed on an N-type substrate 171, and regions 173 and 174 each comprised of 4×5 cells inside that are utilized. The periphery is not selected as dummy shape.

Example of Application

Figure 17:
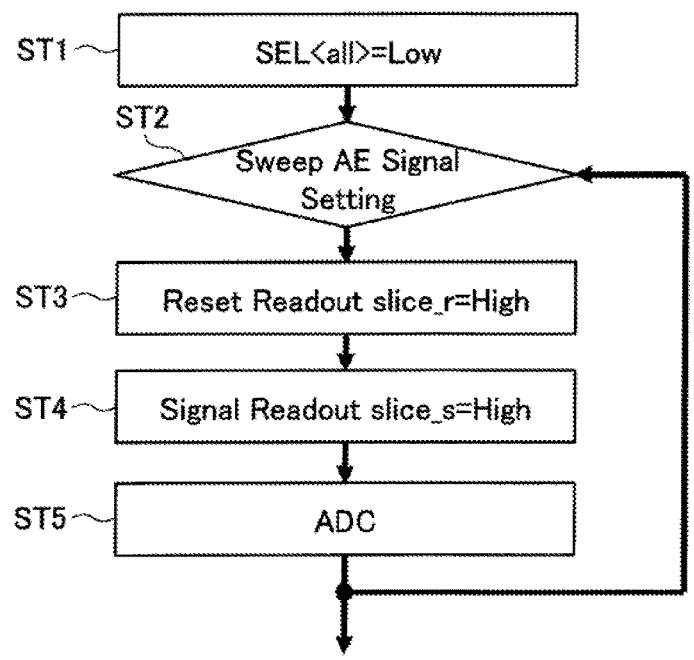
FIG. 17 is a diagram for explaining an example of a test sequence of a solid-state imaging device according to an embodiment of the present invention.

FIG. 17 is a diagram for explaining an example of a test sequence of a solid-state imaging device according to an embodiment of the present invention.

In the example of application, a clip system low price testing method not using any additional elements is shown.

In the test sequence in FIG. 17, the selection transistor SEL-Tr of the selection element of all pixels PXL, in the pixel portion 20 is rendered a nonconductive state (step ST1). In this state, the variable resistance elements R21 and R22 are swept (step ST2), then the clipping circuit-use selection element is rendered a conductive state (steps ST3, ST4) to test the operation of the clipping circuit. At step ST3, the reset-use selection transistor RSEL-Tr of the reset voltage clipping portion 81 in the clipping circuit 80 is rendered a conductive state to obtain a voltage signal through the reset voltage clipping portion 81. At step ST4, the signal-use selection transistor SSEL-Tr of the signal voltage clipping portion 82 in the clipping circuit 80 is rendered a conductive state to obtain a voltage signal through the signal voltage clipping portion 82. Further, at step ST5, AD conversion is carried out by for example the ADC of the readout circuit 40, then both of the reset-use clipping voltage vae_rst and the signal-use clipping voltage vae_sig, or the CDS-processed differential voltage, are output from the chip. By measuring these output codes, the clipping system circuit can be easily tested without using additional elements.

As an application, a method of reading by only a clipping circuit or a method of reading by the clamping circuit 160 and reset circuit 120 or another method may be employed as well. In this case, both of the output of the clamping circuit and the reset circuit 120 or the CDS-processed differential voltage is output from the chip.

The solid-state imaging device 10 explained above can be applied as an imaging device to a digital camera or video camera, portable terminal, or monitoring camera, medical endosoope, or other electronic apparatus.

Figure 18:
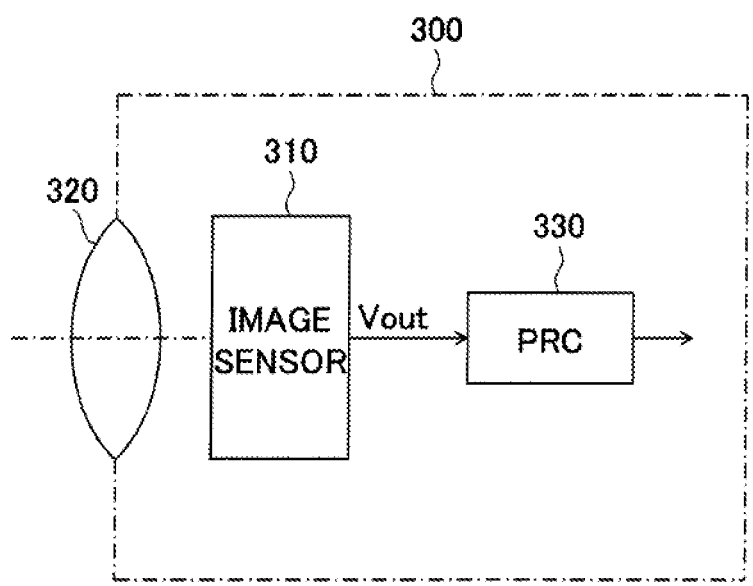
FIG. 18 is a diagram showing an example of the configuration of an electronic apparatus to which a solid-state imaging device according to an embodiment of the present invention is applied.

FIG. 18 is a diagram showing an example of the configuration of an electronic apparatus having a camera system to which a solid-state imaging device according to an embodiment of the present invention is applied wanted therein.

The electronic apparatus 300, as shown in FIG. 18, has a CMOS image sensor 310 to which the solid-state imaging device 10 according to the present embodiment can be applied. Further, the electronic apparatus 300 has an optical system (lens etc.) 320 for guiding the incident light to the pixel region of this CMOS image sensor 310 (framing an object image). The electronic apparatus 300 has a signal processing circuit (PRC) 330 for processing the output signal of the CMOS image sensor 310.

The signal processing circuit 330 applies predetermined signal processing to the output signal of the CMOS image sensor 310. The image signal which is processed in the signal processing circuit 330 can be projected as a moving picture on a monitor configured by a liquid crystal display or the like or can be output to a printer. Further, for example, it can be directly stored in a memory card or other storage medium. Various aspects are possible.

As explained above, by mounting the solid-state imaging device 10 explained before as the CMOS image sensor 310, it becomes possible to provide a high performance, small-sized, and low cost camera system. Further, an electronic apparatus used for applications restricted in the mounting size, number of cables which can be connected, length of the cables, or set heights as requirements of camera installation, for example, a monitoring camera or medical endoscope, can be realized.

The invention claimed is:

1. A solid-state imaging device comprising:
a pixel portion in which pixels are arranged and
a clipping circuit capable of clipping a pixel readout voltage read out from a pixel in accordance with a clipping voltage, wherein
each pixel includes
a photo-electric conversion element which accumulates a charge generated by photo-electric conversion in an accumulation period,
a transfer element capable of transferring the charge accumulated in the photo-electric conversion element in a transfer period,
a floating diffusion to which the charge accumulated in the photo-electric conversion element is transferred through the transfer element,
a source-follower element which converts the charge of the floating diffusion to a voltage signal in accordance with the charge quantity, and
a reset element which resets the floating diffusion to a predetermined potential in a reset period, and
the pixel portion comprises an effective pixel region and an ineffective pixel region, and
the clipping circuit is arranged in the ineffective pixel region between the effective pixel region and an effective optical black region in the pixel portion.

2. A solid-state imaging device as set forth in claim 1, wherein the clipping circuit includes a clipping element capable of clipping a pixel readout voltage read out from the pixel in accordance with a clipping voltage, and
the clipping element is formed by an element having a characteristic equivalent to that of the source-follower element of the pixel.

3. A solid-state imaging device as set forth in claim 2, wherein
the device has a signal line to which a pixel readout voltage read out from the pixel is output, and,
in the clipping circuit,
the clipping element is connected between the signal line and a predetermined power supply.

4. A solid-state imaging device as set forth in claim 3, wherein
the clipping circuit includes
the clipping element which is connected between the signal line and the predetermined power supply,
a clipping circuit-use photo-electric conversion element capable of accumulating a charge generated by photo-electric conversion, and
a clipping circuit-use reset element and a clipping circuit-use transfer element which are connected in series between a predetermined power supply and an accumulation node of the clipping circuit-use photo-electric conversion element and which reset the accumulation node to a predetermined power supply potential.

5. A solid-state imaging device as set forth in claim 4, wherein the clipping circuit-use reset element is set in a conductive state in the reset period.

6. A solid-state imaging device as set forth in claim 3, wherein
the pixel includes
a selection element which is connected between the signal line and a power supply and is controlled in the conductive state and nonconductive state in accordance with a row selection signal, and
the clipping circuit includes
a clipping circuit-use selection element which is connected between the signal line and the predetermined power supply and is controlled in the conductive state and nonconductive state in accordance with a clip selection signal.

7. A solid-state imaging device as set forth in claim 1, wherein the device includes a plurality of clipping circuits of a plurality of columns.

8. A solid-state imaging device as set forth in claim 1, wherein
the device has a clipping voltage control part which controls the clipping voltage of the clipping circuit, and
the clipping voltage control part includes
a detection circuit for detecting a pixel readout voltage which is read out from the pixel through the clipping circuit, and
a clipping voltage generation part which generates the clipping voltage in accordance with a voltage detected by the detection circuit.

9. A solid-state imaging device as set forth in claim 8, wherein
the clipping voltage generation part includes
a clipping voltage generation-use element for generating the clipping voltage in accordance with the voltage detected by the detection circuit, and
the clipping voltage generation-use element is formed by an element having a characteristic equivalent to that of the source-follower element of the pixel.

10. A solid-state imaging device as set forth in claim 9, wherein the clipping voltage generation-use element is formed by including a plurality of dummy pixel elements.

11. A solid-state imaging device as set forth in claim 8, wherein the detection circuit detects a pixel readout voltage read out from an ineffective pixel.

12. A solid-state imaging device as set forth in claim 8, wherein the clipping voltage control part includes a clip margin adjustment circuit which adjusts the clip margin with respect to a voltage detected by the detection circuit and supplies the adjusted voltage to the clipping voltage generation part.

13. A solid-state imaging device as set forth in claim 8, wherein
the detection circuit is formed by a sample/hold circuit, and
the clipping voltage control part includes a reset circuit capable of resetting the sample/hold circuit.

14. A solid-state imaging device as set forth in claim 13, wherein the reset circuit resets the sample/hold circuit in the setup period for each frame.

15. A solid-state imaging device as set forth in claim 13, wherein the device includes a clamping circuit for driving the sample/hold circuit at the time of activation.

16. A solid-state imaging device as set forth in claim 1, wherein
the device includes a readout portion for reading out a pixel signal from the pixel portion, and
the readout portion performs
a first reading operation for reading out a reset voltage in a first readout period following the reset period in a readout scan period and
a second reading operation for reading out a signal voltage in accordance with the accumulated charge in the photo-electric conversion element in a second readout period after at least one the transfer period which is carried out after the first readout period following the reset period,
the clipping circuit is arranged corresponding to the column of pixel array, and
the clipping circuit includes
a reset voltage clipping portion for clipping the reset voltage read out for the first readout period, and
a signal voltage clipping portion for clipping the signal voltage read out for the second readout period.

17. A solid-state imaging device as set forth in claim 1, wherein
the pixel includes
a selection element which is connected between a signal line and a power supply and is controlled in a conductive state and nonconductive state in accordance with a row selection signal, and
the clipping circuit includes a clipping circuit-use selection element which is connected between the signal line and the predetermined power supply and is controlled in a conductive state and nonconductive state in accordance with a clip selection signal, and
the device has a testing function of testing a clipping function with respect to a predetermined signal by rendering the selection element of the pixel a nonconductive state and rendering the clipping circuit-use selection element a conductive state in a state where the predetermined signal is swept.

18. A method for driving a solid-state imaging device having a pixel portion in which pixels are arranged, the pixel portion comprising an effective pixel region and an ineffective pixel region, wherein
each pixel includes
a photo-electric conversion element which accumulates a charge generated by photo-electric conversion in an accumulation period,
a transfer element capable of transferring the charge accumulated in the photo-electric conversion element in a transfer period,
a floating diffusion to which the charge accumulated in the photo-electric conversion element is transferred through the transfer element,
a source-follower element which converts the charge in the floating diffusion to a voltage signal in accordance with the charge quantity, and
a reset element which resets the floating diffusion to a predetermined potential in a reset period,
the method for driving a solid-state imaging device comprising
clipping a pixel readout voltage read out from a pixel in accordance with a clipping voltage of a clipping element which is arranged in the ineffective pixel region between the effective pixel region and an effective optical black region in the pixel portion and is formed by an element having a characteristic equivalent to that of the source-follower element in the pixel.

19. An electronic apparatus comprising:
a solid-state imaging device and
an optical system for forming an object image in the solid-state imaging device, wherein
the solid-state imaging device has
a pixel portion in which pixels are arranged and
a clipping circuit capable of clipping a pixel readout voltage read out from a pixel in accordance with a clipping voltage,
each pixel includes
a photo-electric conversion element which accumulates a charge generated by photo-electric conversion in an accumulation period,
a transfer element capable of transferring the charge accumulated in the photo-electric conversion element in a transfer period,
a floating diffusion to which the charge accumulated in the photo-electric conversion element is transferred through the transfer element,
a source-follower element which converts the charge of the floating diffusion to a voltage signal in accordance with the charge quantity, and
a reset element which resets the floating diffusion to a predetermined potential in a reset period, and
the pixel portion comprises an effective pixel region and an ineffective pixel region, and
the clipping circuit is arranged in the ineffective pixel region between the effective pixel region and an effective optical black region in the pixel portion.

* * * * *